United States Patent [19]

Shimizu

[11] Patent Number: 4,817,177
[45] Date of Patent: Mar. 28, 1989

[54] IMAGE TRANSMISSION SYSTEM

[75] Inventor: Katsuichi Shimizu, Kunitachi, Japan

[73] Assignee: Canon Kabushiki Kaisha, Tokyo, Japan

[21] Appl. No.: 56,320

[22] Filed: May 28, 1987

Related U.S. Application Data

[63] Continuation of Ser. No. 873,293, Jun. 9, 1986, abandoned.

[51] Int. Cl.[4] .............................................. G06K 9/36
[52] U.S. Cl. .................................... 382/41; 350/96.16;
364/131; 370/86; 370/94
[58] Field of Search ................ 382/1, 41, 9; 350/96.1,
350/96.11, 96.16, 96.23; 370/1, 4, 85, 86, 88, 94;
371/124, 22; 455/600, 602, 606, 613; 358/901;
364/131, 132; 250/227; 355/14 C

[56] References Cited

U.S. PATENT DOCUMENTS

| | | | |
|---|---|---|---|
| 3,863,220 | 1/1975 | Osawa et al. | 370/86 |
| 4,144,550 | 3/1979 | Donohue et al. | 364/132 |
| 4,166,946 | 9/1979 | Chown et al. | 350/96.16 |
| 4,333,176 | 6/1982 | Looschen | 370/4 |
| 4,412,326 | 10/1983 | Limb | 370/85 |
| 4,417,334 | 11/1983 | Gunderson et al. | 364/200 |
| 4,471,466 | 9/1984 | Stollberger | 370/86 |

Primary Examiner—Leo H. Boudreau
Assistant Examiner—Joseph Mancuso
Attorney, Agent, or Firm—Fitzpatrick, Cella Harper & Scinto

[57] ABSTRACT

An image transmission system in which plural image processing devices are mutually connected in a loop through optical fibers for high-speed transmission of image information. The information to be transmitted is represented by an image packet and a command packet, both of which are transmitted through a common optical fiber.

14 Claims, 28 Drawing Sheets

FIG. 5

| 1 2 3 4 | 5 6 7 8 | 9 10 11 12 | 13 14 15 16 | 17 18 19 20 | 21 | 22 23 | 24 25 26 27 | 28 29 | 30 31 | 32 |
|---|---|---|---|---|---|---|---|---|---|---|
| ADDRESS OF DESTINATION (I) | NUMBER OF TRANSMISSIONS TO DESTINATION (I) | ADDRESS OF DESTINATION (II) | NUMBER OF TRANSMISSIONS TO DESTINATION (II) | ADDRESS OF TRANSMITTER | SIZE OF ORIGINAL | | | | | |

- 21: SIZE OF ORIGINAL
- 22: IS READY TO RECEIVE ?
- 23: COMMAND TO START TRANSMISSION
- 24: IS RECEIVING COMPLETED ?
- 28: RESPONSE FROM DESTINATION (I)
- 30: RESPONSE FROM DESTINATION (II)
- 32: LINE CONNECTION IS GOING ON

FIG. 6A

|   | | 1 2 3 4 5 6 7 8 9 10 11 12 13 14 15 16 17 18 19 20 21 22 23 24 25 26 27 28 29 30 31 32 |
|---|---|---|
| ① | B | 0000 0000 0000 0000 0000 0000 0000 0000 |
| ② | A | 0100 1000 1100 0100 1000 0000 0000 0001 |
| ③ | D | 0100 1000 1100 0100 1000 0000 0000 0001 |
| ④ | C | 0100 1000 1100 0100 1000 0000 0000 0011 |
| ⑤ | B | 0100 1000 1100 0100 1000 0000 0000 0111 |
| ⑥ | A | 0010 1100 0000 0000 1000 0000 0000 0001 |
| ⑦ | D | 0010 1100 0000 0000 1000 0000 0000 0101 |
| ⑧ | C | 0010 1100 0000 0000 1000 0000 0000 0101 |
| ⑨ | B | 0010 1100 0000 0000 1000 0000 0000 0101 |
| ⑩ | A | 0100 0000 1100 0000 1000 0100 0000 0001 |
| ⑪ | D | 0100 0000 1100 0000 1000 0100 0000 0001 |
| ⑫ | C | 0100 0000 1100 0000 1000 0100 0000 0011 |
| ⑬ | B | 0100 0000 1100 0000 1000 0100 0000 0111 |
| ⑭ | A | 0010 0000 0000 0000 1000 0100 0000 0001 |
| ⑮ | D | 0010 0000 0000 0000 1000 0100 0000 0101 |
| ⑯ | C | 0010 0000 0000 0000 1000 0100 0000 0101 |
| ⑰ | B | 0010 0000 0000 0000 1000 0100 0000 0101 |
| ⑱ | A | 0100 0000 1100 0000 1000 0010 0000 0001 |
| ⑲ | D | 0100 0000 1100 0000 1000 0010 0000 0001 |
| ⑳ | C | 0100 0000 1100 0000 1000 0010 0000 0011 |
| ㉑ | B | 0100 0000 1100 0000 1000 0010 0000 0111 |
| ㉒ | A | 0010 0000 0000 0000 1000 0010 0000 0001 |
| ㉓ | D | 0010 0000 0000 0000 1000 0010 0000 0101 |

FIG. 6B

| | | | | | |
|---|---|---|---|---|---|
| ㉔ | C↕B | 0010 0000 0000 0000 1000 0010 0000 0101 | | | |
| ㉕ | ↕A↕D | 0010 0000 0000 0000 1000 0010 0000 0101 | | GENERATION OF IMAGE INFO OF 1st SHEET | |
| ㉖ | ↕C | 1st SH IMAGE INFO | | | |
| ㉗ | ↕B | 1st SH IMAGE INFO | | READ | |
| ㉘ | ↕A | 1st SH IMAGE INFO | | READ | |
| ㉙ | ↕D | 1st SH IMAGE INFO | | READ | |
| ㉚ | ↕C | 2nd SH IMAGE INFO | | GENERATION OF IMAGE INFO OF 2nd SHEET | |
| ㉛ | ↕B | 2nd SH IMAGE INFO | | READ | |
| ㉜ | ↕A | 2nd SH IMAGE INFO | | READ | |
| ㉝ | ↕D | 2nd SH IMAGE INFO | | | |
| ㉞ | ↕C | 3rd SH IMAGE INFO | | GENERATION OF IMAGE INFO OF 3rd SHEET | |
| ㉟ | ↕B | 3rd SH IMAGE INFO | | READ | |
| ㊱ | ↕A | 3rd SH IMAGE INFO | | | |
| ㊲ | ↕D | 3rd SH IMAGE INFO | | | |
| ㊳ | ↕C | 0100 0000 1100 0000 0000 0001 0000 0001 | | | |
| ㊴ | ↕B | 0100 0000 1100 0000 0000 0001 0000 0001 | | | |
| ㊵ | ↕A | 0100 0000 1100 0000 0000 0001 0000 0011 | | | |
| ㊶ | ↕D | 0100 0000 1100 0000 0000 0001 0000 0111 | | | |
| ㊷ | ↕C | 0010 0000 0000 0000 1000 0010 0000 0001 | | | |
| ㊸ | ↕B | 0010 0000 0000 0000 1000 0010 0000 0101 | | | |
| ㊹ | ↕A | 0010 0000 0000 0000 1000 0010 0000 0101 | | | |
| ㊺ | ↕D | 0010 0000 0000 0000 1000 0010 0000 0101 | | | |
| ㊻ | ↕D | 0000 0000 0000 0000 0000 0000 0000 0000 | | | |

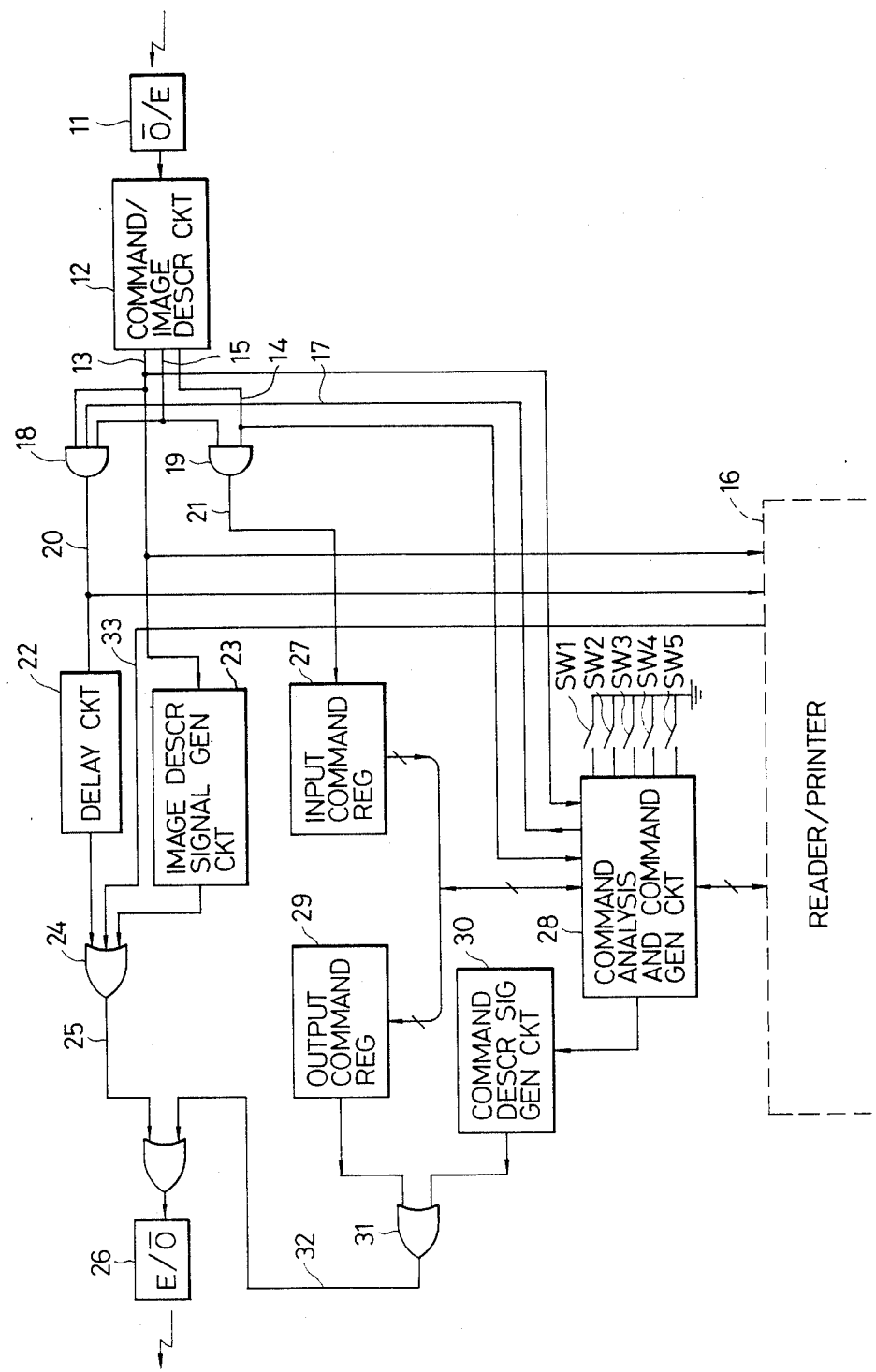

《INTERRUPT ROUTINE FOR COMMAND DESCRIMINATING SIGNAL》

IMAGE TRANSMISSION SYSTEM

This application is a continuation of application Ser. No. 873,293, filed June 9, 1986, now abandoned.

BACKGROUND OF THE INVENTION

1. Field of the Invention

The present invention relates to an image transmission system, and more particularly to such system in which plural image processing devices such as an image reading device or an image recording device are mutually connected through a signal transmission channel such as optical fibers for transmitting image information among such devices.

2. Description of the Prior Art

There are already proposed or in use various information transmission systems in which plural information processing devices are mutually connected through signal transmission channels for mutual exchange of information among such devices or information distribution from one device to others.

Also recently proposed is the information transmission in the form of optical signals through optical fibers instead of the conventional information transmission by electrical signals. Such transmission through the optical fibers avoids electromagnetic perturbation from the exterior, allows high-speed transmission and facilitates the extention of transmission channels because of the lighter weight of such optical fibers.

Information can be largely classified into two categories, one being data information only identifiable by computers, and the other being image information only identifiable through human perception. The conventionally proposed transmission through optical fibers relates only to the data information and is achieved through time-sharing means among plural devices mutually connected by optical fibers. However such time-sharing means has a limitation in the amount of information transmittable per unit time, and is therefore unable to fully exploit the advantage of the optical fibers as the medium for high-speed transmission.

Also clear transmission of an image with a high resolving power requires a large amount of image information per original document, which is preferably transmitted in continuous manner in consideration of the nature of image information. For this reason the optical fibers have to be occupied for a long time if such image information is transmitted through the time-sharing means.

Furthermore such time-sharing means often requires the use of a complicated separating circuit for identifying plural information present on the optical fibers.

Besides, in case of transmitting image information from an image processing device to plural similar devices, they are seldom in a position to receive the information simultaneously because of the difference in the status thereof. For this reason the transmission is usually achieved by once storing the image information to be transmitted in a memory in the transmitting device, and by thereafter transmitting the information from said memory to each device in a status capable of receiving the information. However such transmission method with a resolving power as high as 16 pel/mm or 16 line/mn requires a memory capacity of 15,996,720 bits for an image of A4 size, and such memory is too costly in order to be equipped in all the devices transmitting the information.

Although there are known various transmission systems for signal transmission through optical fibers, a loop transmission system is advantageous in consideration of the length of optical fiber required for connecting plural terminal devices and of the transmission speed. Such loop transmission system is disabled if the optical fiber constituting the loop is broken for some reason. In order to rapidly cope with such failure each device belonging to the loop is provided with means for detecting the breakage of the loop by detecting the return of a signal emitted by said device, but a particular protocol is required for such loop failure detection.

Also in such a loop transmission system, the collision of plural signal packets from the different terminal devices is avoided by providing the devices in the loop with semi-fixed priorities, according to which the demands for transmission are identified and ordered. Such system however requires a particular circuit for identifying the priorities, and it is not easy to change such priorities.

SUMMARY OF THE INVENTION

In consideration of the foregoing, the principal object of the present invention is to provide a transmission system capable of high-speed image transmission.

Another object of the present invention is to provide an image transmission system in which plural image processing devices are mutually connected through optical fibers for image transmission among said devices, said system being capable of high-speed transmission fully exploiting the advantage of the optical fibers and of facilitating image transmission to plural image processing devices.

Still another object of the present invention is to provide an image transmission system in which plural image processing devices are mutually connected in a loop and the information is transmitted in packet form through said loop for achieving high-speed image transmission.

Still another object of the present invention is to achieve high-speed image transmission by dividing information relating to the image transmission into an image packet and a command packet and by transmitting both packets through a common optical fiber.

Still another object of the present invention is to provide a transmission system capable of real-time transmission of different image information simultaneously to plural destinations.

Still another object of the present invention is to provide a transmission system capable of identifying plural information present on the transmission channel, for example image information and control information relating to the transmission of said image information, with a simple circuit and with a high speed.

Still another object of the present invention is to provide a transmission system in which each terminal device is capable of detecting the loop failure with a simple structure in the usual information transmission procedure instead of a particular protocol.

Still another object of the present invention is to provide a transmission system in which the priorities for the use of the loop are dynamically determined for plural terminal devices connected to the loop, thereby preventing the collision of plural information on the loop.

The foregoing and still other objects of the present invention will become fully apparent from the following description.

BRIEF DESCRIPTION OF THE DRAWINGS

FIG. 5 is a chart showing the contents of the command signal packet;

FIG. 6A and FIG. 6B are charts showing the protocol for the image transmission;

FIG. 7 is a block diagram showing an embodiment of a terminal device;

FIGS. 9, 10A-1, 10A-2, 10B-1, 10B-2, 10C-1, 10C-2, 10C-3, 10D, 10E, 10F, 10G, 10H-1, 10H-2, 10I, 10J, 11, 12A, 12B, 12C, 12D, 13 are control flow charts of the central processing unit.

DESCRIPTION OF THE PREFERRED EMBODIMENTS

Now the present invention will be explained in detail by referring to preferred embodiments thereof shown in the attached drawings.

Figure 1:
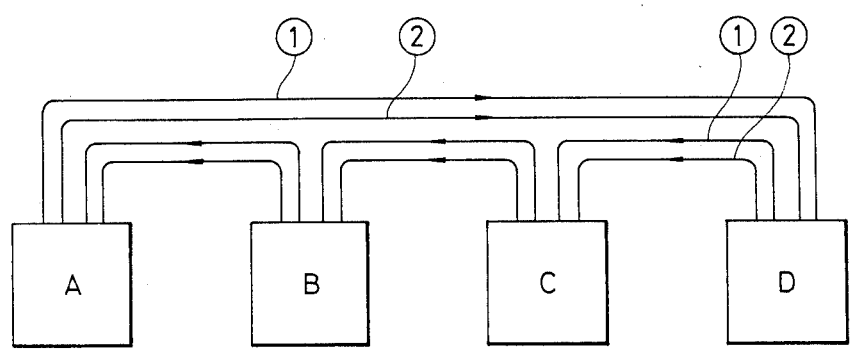
FIG. 1 is a schematic view showing the connections of an optical-fiber loop transmission system embodying the present invention.

FIG. 1 shows, as an embodiment of the present invention, a loop transmission system utilizing optical fibers for the signal transmission channels In the following description, image information in a signal packet form is called an image packet, and control information in a signal packet form is called a command packet. There are provided terminal devices A, B, C and D, representing for example an image reading unit provided with a solid-state image sensor such as charge-coupled device, an image recording unit such as a laser beam printer, an image processing unit provided with an optoelectric (O/E) converter and an electrooptic (E/O) converter etc. As illustrated, said terminal devices A, B, C and D are mutually connected in a loop through two parallel optical fibers, constituting a packet line 1 for transmitting the command packet and the image packet and a packet line 2 for transmitting clock signals synchronized with said packets. As explained above, the present embodiment is designed to transmit the command packet and the image packet through a common optical fiber, achieving high-speed transmission in such packet form.

When the terminal devices are powered to activate the transmission system, an "empty" command packet, having no information, is transmitted through the loop, and clock signals synchronized with said empty packet are transmitted through the clock line 2. One of the terminal devices is designed as a master terminal for generating said empty command packet at the start of function of the system. The empty command packet issued by said master terminal is thus transmitted in succession through other terminals, and each terminal generates control information in response to said empty packet and transmits said information as a command packet through the loop. In this manner each terminal can release a command packet only upon reception of an empty packet transmitted through the loop, and simultaneous emission of commands from plural terminals to the loop is therefore prevented. Any terminal may be selected to release the empty command packet at the start of the system function. Each terminal identifies the entry of a packet by the entry of a clock signal transmitted through the clock line 2 in synchronization with said packet. At the start of the system function, command packets alone are transmitted through the loop since the image packet is transmitted only after a mutual understanding is made between a transmitting terminal and a receiving terminal through a protocol achieved by said command packets.

In the system shown in FIG. 1, it is assumed that the terminal A is selected as the master terminal for generating the command packet at the start of system function. When the power supply to the terminals A, B, C and D is turned on, the terminal A transmits the empty command packet to the terminal D. Said command packet is usually an empty packet having "0" signals only on the packet line 1, but the entry of said empty packet is identified by the entry of a clock signal to the terminal D through the clock line 2 in synchronization with said empty command packet. The terminal D analyzes and identifies the received command packet as an empty packet, and confirms then if a demand of the user for image transmission is present in the terminal D itself. If such demand is absent, the terminal D transmits the empty packet to the terminal C. However, if such demand is present in the terminal D, it adds, to the received empty packet, appropriate bits indicating a loop status under connection and those corresponding to certain control information representing the address of a terminal of destination for image transmission, the address of the transmitting terminal D, the number of times of image transmission and the image size, thus initiating a protocol to the succeeding terminal C. Thereafter the terminal D awaits a response from said terminal of destination. It will be understood that the empty command packet is changed at this point to a command packet bearing the above-mentioned control information. The terminal C similarly performs the analysis and generation of the command packet and transmits it to the terminal B. The terminal B similarly transmits the command packet to the terminal A, which in turn transmits the command packet in a similar manner to the terminal D. In this manner the command packet is transmitted in the loop in one direction as shown by arrows in FIG. 1. Therefore the command packet can initially be generated only by the master terminal at the start of the system function and can thereafter be generated only by a terminal which has received the command packet, so that the loop never contains plural packets at the same time, thus avoiding the collision or confusion arising from the presence of plural packets.

Each of the terminals A, B, C and D is equipped with a timer for constantly detecting breakage of the loop in the following manner. A breakage occurs when any terminal is not powered or when the optical fiber itself is physically cut. Naturally a loop transmission system does not function properly unless all the optical fibers and all the connected terminals are in a completely functionable state. The detection of loop breakage is achieved utilizing a fact that a packet should always be circulated along the loop and received by the emitting terminal within a determined period after the emission if the loop is in a normal state. Immediately after the start of power supply, the master terminal A, alone capable of generating the command packet in this state, generates the command packet and simultaneously activates the aforementioned timer. A loop breakage is identified if the command packet is not received within a period determined by said timer. Also each of other terminals B, C and D activates the corresponding timer at the start of power supply and identifies a loop breakage if the command packet is not received within a period determined for each timer or if the command packet, after the first transmission thereof, is not received again within a determined period. Also for an eventual breakage in the loop during the function thereof, each terminal activates the timer simultaneously with the transmission of a packet and constantly inspects if the succeeding packet is received within a determined period. In this manner the breakage detection can be achieved without an exclusive protocol or an exclusive circuit therefor. As explained before, any terminal may be selected to create the command packet at the start of the system function, and the timer periods for breakage detection in other terminals are determined respectively according to said selection. The information transmission in the packet form according to the present invention enables high-speed transmission without collision of the information on the loop and with facilitated detection of breakage in the loop.

Figure 2:
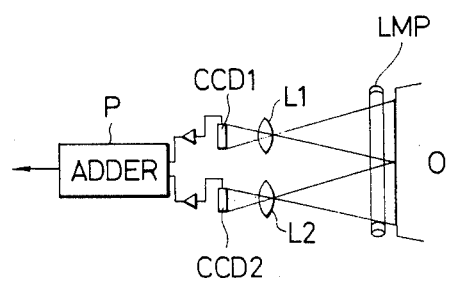
FIG. 2 is a schematic view showing the structure of an image reading unit.

FIG. 2 schematically shows an image reading unit provided on the terminals A, B, C and D, performing the subsidiary scanning on an original of A4 size (210×297 mm) in the transversal direction or an original of A3 size (297×420 mm) in the longitudinal direction with a line density of 16 line/mm and with a resolving power of 16 pixels/mm in the main scanning direction. Thus the main scanning provides 16 bits/mm×297 mm=4752 bits, and the subsidiary scanning provides 16 lines/mm×210 mm=3360 lines for the A4 size or 6720 lines for the A3 size. As shown in FIG. 2, an original document O is illuminated by a fluorescent lamp LMP, and the reflected light is focused through lenses L1, L2 to two photoelectric converters CCD1, CCD2 arranged along the main scanning direction. In this manner the image on the original O is divided and converted into electric signals, which are subsequently converted into image information for a line by an adder P. This procedure is repeated for 3360 lines in the A4 size or 6720 lines in the A3 size.

Figure 3:
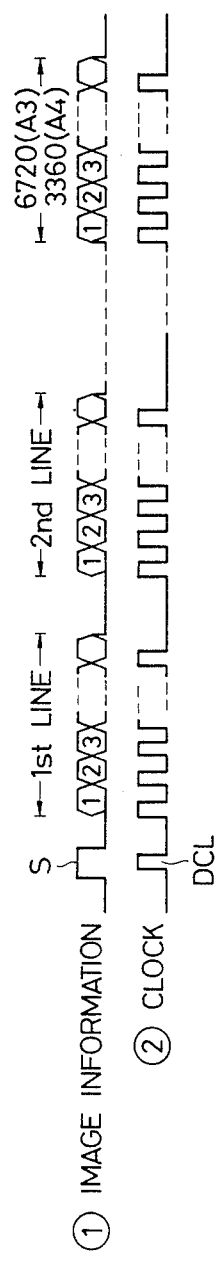
FIG. 3 is a view showing an image signal packet.

The image information thus obtained is transmitted, after electrooptical conversion, as an image packet through the optical fibers. As shown in FIG. 3, the image packet is synchronized with clock signals transmitted through the clock line 2, and each clock signal is started at the changing point of a data signal and is terminated while the data signal is stable. The image packet is preceded by an identification signal S, which is synchronized with a dummy clock DCL on the clock line 2. Said identification signal S, being "1" for an image packet and "0" for a command packet, allows each terminal to identify if the following packet is an image packet or a command packet and to perform an appropriate processing.

Figure 4:
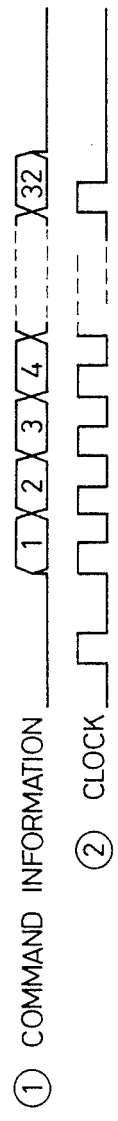
FIG. 4 is a view showing a command signal packet.

FIG. 4 shows a command packet which is preceded by a "0" identification signal S as explained above and synchronized with the dummy clock DCL on the clock line 2. Said command packet is similarly synchronized with clock pulses on the clock line 2, and each clock signal is initiated at the changing point of a data signal. The command packet is composed of 32 bits, in which, as shown in FIG. 5, the 1st to 4th bits are used for representing the address of a first destination; the 5th to 8th bits for the number of transmissions to said first destination; the 9th to 12th bits for the address of a second destination; the 13th to 16th bits for the number of transmissions to said second destination; the 17th to 20th bits for the address of the transmitting terminal; the 21st bit for the original size, indicating A3 or A4 size respectively at "1" or "0"; the 22nd bit for asking, in the state "1", if the destination is ready to receive the transmission; the 23rd bit for indicating, in the state "1", the start of image transmission; the 24th bit for asking, in the state "1", if the reception of transmission is completed; the 25th to 29th being blanks; the 30th bit for indicating, in the state "1", an affirmative response from the first destination to a command; the 31st bit for indicating, in the state "1" an affirmative response from the second destination; and the 32nd bit for indicating, in the state "1", that the loop is already occupied by a terminal in response to a demand for transmission released from said terminal. In this manner each command packet is capable of designating plural destinations, transmitting responses therefrom, simultaneously indicating the number of transmissions to plural destinations and the image size, and asking or indicating the readiness for reception, start of transmission and completion of transmission from the transmitting terminal to the destinations.

FIGS. 6A and 6B show the procedure of a protocol for transmitting the images of respectively different numbers to the terminals B, C and D from the terminal A in the system shown in FIG. 1. The addresses for the terminals A, B, C and D are respectively "1000", "0100", "1100" and "0010". As an example, let us consider a case in which the terminal A transmits one, two and three images respectively to the terminals B, C and D, all in A4 size.

At the step (1), in response to an empty packet, the terminal A forms the command packet by setting "1" to the bit indicating that the loop is in use; the address "0100" of the terminal B as the first destination; the address "1100" of the terminal C as the second destination; a binary number "1000" representing one transmission to the first destination B; a binary number "0100" representing two transmissions to the second destination C; and "1" indicating an A4 image size. In the step (2) the command packet thus formed is transmitted to the terminal D, which identifies said packet as irrelevant and transmits it to the terminal C in the step (3). The terminal C analyzes the received command packet, adds "1" to the response bit of the second destination indicating the acceptance of command and transmits the packet in the step (4) to the terminal B. The terminal B analyzes the packet, adds "1" to the response bit of the first destination indicating the acceptance of command and transmits the packet in the step (5) to the terminal A. The terminal A, upon confirmation of the responses from the first and second destinations by analyzing the received command packet, modifies the command packet by changing the first destination to an address "0010" representing the terminal D, changing the second destination to blank, setting a binary number "1100" indicating three transmissions to the first destination D, setting blank for the number of transmissions to the second destination, and maintaining the bit "1" for the A4 image size, and transmits the thus modified command packet in the step (6) to the terminal D. The terminal D analyzes the command packet, adds "1" to the response bit of the first destination indicating the acceptance of the command and transmits the packet in the step (7) to the terminal C. The packet now being irrelevant thereto, the terminal C passes on the packet in the step (8) to the terminal B, which similarly transmits said packet in the step (9) to the terminal A. Upon confirmation of the response from the first destination D, the terminal A modifies the common packet by selecting the terminals B and C respectively as the first and second destinations and setting the bit "1" for asking if the destination terminal is ready to receive the transmission, and transmits thus modified packet to the terminal D in the step (10). The packet being irrelevant, the terminal D passes the packet on to the terminal C in the step (11). The terminal C analyzes the command packet, sets "1" in the response bit of the second destination if it is ready to receive the transmission, and transmits the packet in the step (12) to the terminal B. The terminal B likewise analyzes the packet, sets "1" in the response bit of the first destination if it is ready to receive the transmission, and transmits the packet in the step (13) to the terminal A. After analyzing the command packet for confirming the readiness for reception of the first and second destinations B, C, the terminal A modifies the command packet by setting the terminal D as the new first destination, setting blank for the second destination and setting the bit "1" for asking if the destination is ready to receive the transmission, and transmits thus modified command packet to the terminal D in the step (14). The terminal D analyzes the command packet, adds "1" to the response bit of the first destination if it is ready to receive the transmission, and transmits the packet in the step (15) to the terminal C. The packet now being irrelevant, the terminal C passes the packet on in the step (16) to the terminal B, which likewise transmits the packet in the step (17) to the terminal A. After confirming the response from the first destination D, the terminal A modifies the command packet by setting the bit "1" indicating the start of transmission, and selecting the terminals B and C respectively as the first and second destinations, and transmits thus modified command packet in the step (18) to the terminal D. Said command packet is similarly transmitted in the steps (19) to (21) to the terminals D, C and B for analysis and setting of the response bits, and is again transmitted to the terminal A. After confirming the responses from the terminals B, C, the terminal A modifies the command packet by selecting the terminal D as the first destination and setting the bit "1" for indicating the start of transmission, and transmits the thus modified command packet to the terminal D in the step (22). Said command packet is similarly transmitted through the terminal D, C and B in the steps (23) to (25) for analysis and for setting of the response bit, and is again transmitted to the terminal A, whereupon the response from the terminal D is confirmed. Now the destinations B, C and D are made ready to receive the image transmissions. Then the terminal A forms an image packet by reading a first original, and transmits said image packet to the terminals D, C and B in the steps (26) to (28), whereby said terminals store the image information of the original. Upon returning of the first image packet in the step (29), the terminal forms another image packet by reading a second image, and transmits said image packet to the terminals D, C and B in the steps (30) to (32), whereupon the terminals D and C store thus transmitted image information whereas the terminals B merely passes the packet to the terminal in the step (33). Upon returning of the second image packet, the terminal A forms another image packet by reading a third original and transmits said image packet to the terminals D, C and B in the steps (34) to (36), whereupon the terminal D alone stores the image information whereas the terminals C and B merely pass the packet on to the terminal A in the step (37).

In this manner one, two and three images are respectively transmitted to the terminals B, C and D from the terminal A. After receiving the third image packet, the terminal A modifies the command packet as aforementioned by selecting the terminals B and C respectively as the first and second destinations and setting the bit for asking the completion of reception, and transmits the thus modified command packet to the terminal D in the step (38). Said command packet is transmitted to the terminals D, C and B in the steps (39) to (41). After confirming the responses from the terminal B, C, the terminal A modifies the command packet by selecting the terminal D as the first destination and setting the bit "1" for asking the completion of reception, and transmits the thus modified command packet in the step (42) to the terminal D. Said command packet is in succession transferred through the terminals D, C and B in the steps (43) to (45), and the entire protocol for the image transmission is terminated when the terminal A confirms the response from the terminal D. In the succeeding step (46) an empty packet is transferred from the terminal A to D, then to C and to B, thus awaiting a next demand for transmission. In this manner high-speed transmission effectively utilizing the transmission speed of the optical fibers is rendered possible by arranging all the terminals ready for reception prior to the transmission of image information and thereafter transmitting the information simultaneously to plural terminals. A terminal not selected as a destination by the command packet merely passes the received command packet on to a succeeding terminal, so that a same procedure can be applied both in case of transmitting the image information to all the terminals and also in case of transmitting images of different numbers to different terminals. Furthermore erroneous transmission can be avoided since each step in the procedure is initiated after confirming the responses from the terminals to the control information in the command packet.

In the following there will be given an explanation on the determination of priority in case two or more terminals have demands for transmission when an empty packet is transmitted on the loop. As an example, let us consider a case where demands for transmission are given by the terminals A, B shown in FIG. 1. In case such demands are given to the terminals A, B when an empty packet is received by the terminal D, said packet is then transmitted to the terminal C and to B, so that a bit indicating the occupied state of the loop is set in the empty packet by the terminal B. In this manner the terminal B acquires the right of transmission prior to the terminal A. Stated differently, a terminal connected immediately to the output of the terminal currently releasing the empty packet has the highest priority. The priority becomes lower in the order of transmission of the empty packet, and is lowest at a terminal connected to the input of the above-mentioned terminal currently releasing the empty packet. Also in case demands for transmission are given to plural terminals during the transmission of an image, the highest priority is given, when the image transmission is completed and an empty packet is released from the transmission-emitting terminal, to a terminal connected next to said emitting terminal, and the lowest priority is given to a terminal preceding said emitting terminal. In this manner, at the end of an image transmission, the priority in the loop for the next transmission is automatically determined in relation to the terminal which has emitted the preceding transmission. Consequently the priority in the loop changes dynamically from time to time.

FIG. 7 shows an embodiment of a terminal circuit for use in the image transmission system of the present invention, wherein an optoelectric (O/E) converter 11 at the input end of the terminal converts the input information, supplied as optical signals through optical fibers, into electric signals. A command/image discriminating circuit 12 identifies the electric signals from the O/E converter 11 as an image packet or as a command packet, according to the aforementioned identification signal S preceding said packet and the synchronized clock signal, and supplies a signal "1" to a line 13 or 14 respectively in case of an image packet or a command packet. Also said circuit 12 supplies the packet without said identification signal S to a line 15. A reader/printer unit 16 performs image recording in response to the entered image packet and reads an original to form an image packet. A line 17 releases a non-emission signal "1" constantly if the image information does not originate from this terminal. An AND circuit 18, in response to the signal "1" from the line 17, transfers the image packet on the line 15 to a line 20. Also an AND circuit 19, in response to the signal "1" supplied from the command/image discriminating circuit 12 through the line 14, transfers the command packet on the line 15 to a line 21. In case the image information originates from this terminal, the non-emission signal on the line 17 is changed to "0", forbidding the transfer of the entered image packet onto the line 20. In this manner the image packet transmitted through all the terminals is prevented from repeated transmission.

The image packet on the line 20 is guided to the reader/printer unit 16 and to a delay circuit 22, which delays said image packet for forming an identification signal S in front of said packet prior to the transmission to the suceeding terminal. An identification signal generating circuit 23 forms, in response the signal "1" from the line 13, an identification signal to be attached in front of the entered image packet. An OR circuit 24 attaches the identification signal S "1" from the abovementioned circuit 23 in front of the image packet supplied from the delay circuit 22, or, in case the image information originates from this terminal, in front of the image information supplied from the reader/printer unit 16 to a line 33, and supplies said image packet to a line 25. An electrooptical (E/O) converter 26 at the output end of the terminal converts the image packet from the line 25 into optical signals for transmission to the suceeding terminal. Also the command packet on the line 21 is supplied through the AND gate 19 to an input command register 27, which stores the entire 32 bits of said command packet. A command analysis/generator circuit 28 receives the image packet discrimination signal from the line 13 or the command packet discrimination signal from the line 14. Said circuit 28 accepts the command packet of 32 bits when it is entirely stored in the input command register 26, analyzes the content of said packet, forms the response bits or selecting bits as explained in the foregoing, and transfers the command packet of 32 bits to an output command register 29. Also said circuit 28 releases the non-emission signal on the line 17 when the image information does not originate from this terminal. A command identification signal generating circuit 30 forms an identification signal S to be attached in front of the command packet. An OR circuit 31 attaches the identification signal S supplied from said generating circuit 30 in front of the command packet entered from the output command register 29, and supplies said command packet to a line 32. The command packet is then converted into optical signals similarly in the E/O converter 26 and is transmitted to the succeeding terminal through the optical fiber also used for the transmission of the image packet.

Four switches SW1-SW4 provided on the command analysis/generator circuit 28 are utilized for determining the address of the terminal. Another switch SW5 enables the emission of a command packet at the start of system function, and is to be turned on in only one of the terminals in the system. These five switches are selectively set only at the initial installation of the system and need not be manipulated unless a modification is required in the system.

Figure 8:
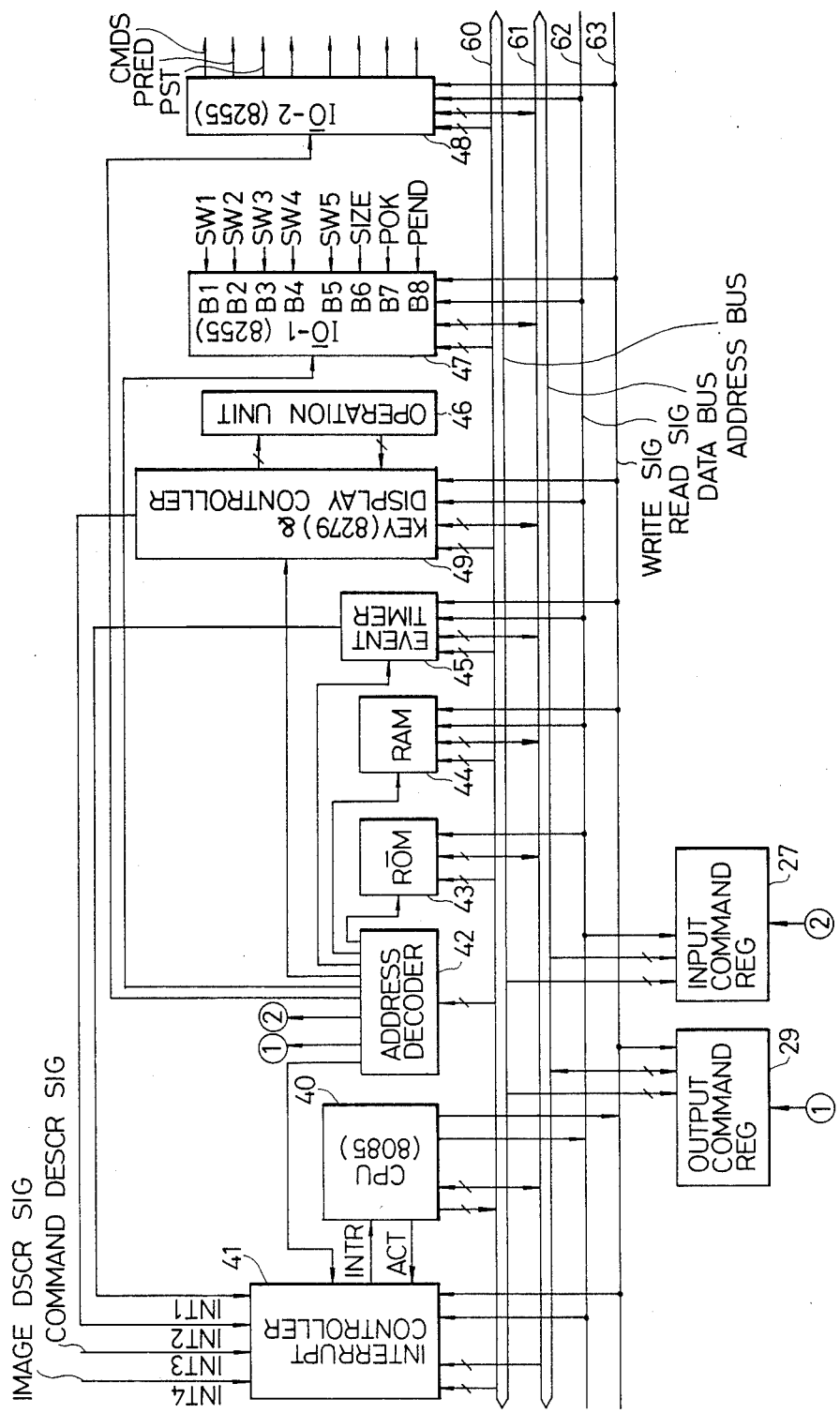
FIG. 8 is a circuit diagram for command analysis and command generation.

FIG. 8 is a detailed circuit diagram of the command analysis/generator circuit 28 shown in FIG. 7, wherein shown are an address bus 60, a data bus 61, a read signal line 62, a write signal line 63, a central processing unit (CPU) 41 composed for example of an Intel 8085 for controlling the function of the circuit shown in FIG. 8, and an interruption controller 41 composed for example of an Intel 8259 for supplying an interruption signal to the CPU 40. The CPU 40 is activated in response to said interruption controller 41. Said interruption controller 41 receives a signal INT1 indicating the lapse of a determined period in the aforementioned timer for detecting the loop breakage, a signal INT2 indicating a key actuation on an operation unit in the circuit, the command discrimination signal INT3 and the image discrimination signal INT4 from the command/image discriminating circuit 12 shown in FIG. 7. In response to one of these four signals, the interruption controller 41 releases an interruption signal INTR to activate the CPU 40. An address decoder 42 accesses various units controlled by the CPU 40, according to the address information supplied by the CPU 40 through the address bus 60. Also there are provided a read-only memory (ROM) 43 storing the control program for the CPU 40, a random access memory (RAM) 44 having a memory space as shown in Table 1, an event timer 45 for the aforementioned detection of loop breakage, an operation unit 46 of the terminal, a key-and-display controller 49 composed for example of an Intel 8279 for input/output control of the keys and display unit on said operation unit 46, and input/output (I/O) ports 47, 48 composed for example of an Intel 8255. The I/O port 47 receives eight signals; i.e. signals from the switches SW1-SW5 in the command analysis/generator circuit, a signal SIZE indicating the size of a recording sheet set on the reader/printer unit 16, a signal POK indicating the standby state of the printer, and a signal PEND indicating the end of the printer operation. Also the I/O port 48 releases a signal CMDS for instructing the command discrimination signal generating circuit 30 to generate the command discrimination signal, a signal PRED for preparing the printer for operation, a signal PST for starting the printer etc. 29 and 27 respectively indicate the output command register and the input command register shown in FIG. 7.

TABLE 1

| RAM TABLE | |
|---|---|
| MASTER FLAG | CHANNEL NUMBER |
| LINE CHECK FLAG | ADDRESS 1 IMAGE NUMBER CODE AREA |
| LINE NORMAL FLAG | ADDRESS 2 IMAGE NUMBER |

TABLE 1-continued

RAM TABLE

| | CODE AREA |
|---|---|
| LINE ABNORMAL FLAG | ADDRESS 3 IMAGE NUMBER CODE AREA |
| DESTINATION (I) FLAG | ADDRESS 4 IMAGE NUMBER CODE AREA |
| FILL 2 FLAG | DESTINATION ADDRESS CODE |
| FILL 3 FLAG | ORIGINAL SIZE |
| REPEAT FLAG | RECEIVED IMAGE NUMBER AREA |
| TRANSMISSION REQUEST FLAG | MAXIMUM IMAGE NUMBER AREA |
| TRANSMITTER FLAG | TRANSMITTED COMMAND PACKET |
| RECEIVER FLAG | RECEIVED COMMAND PACKET |
| RECEPTION COMPLETION FLAG | |

FIGS. 9 to 13 show control flow charts of the CPU 40 in the command analysis/generator circuit 28. These programs, stored in the ROM 43, will be explained in the following.

After the start of power supply, the aforementioned detection of loop breakage is conducted in the following manner.

Figure 9:
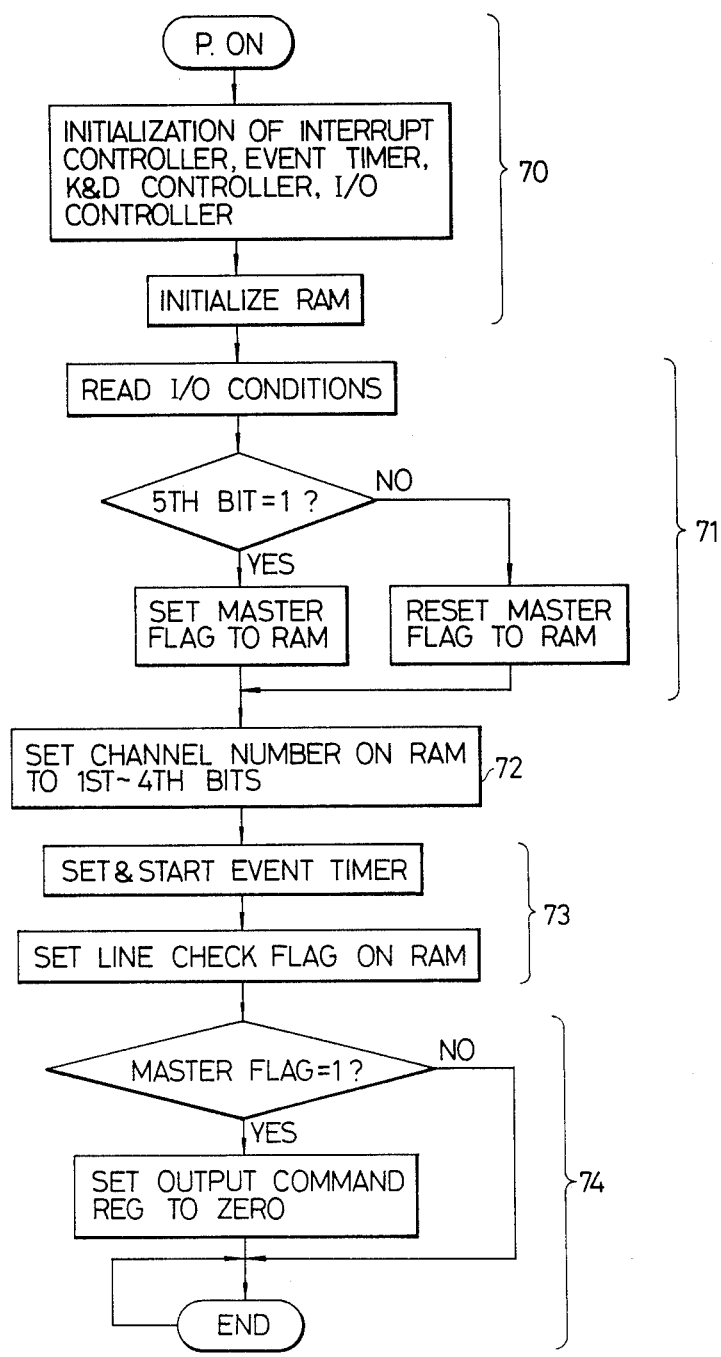

FIG. 9 shows the power-on flow. After the terminal is powered, the step 70 initializes the interruption controller 41, event timer 45, key-and-display controller 49, I/O controllers 47, 48 and RAM 44 shown in FIG. 8. Then the data reading from the I/O controller 47 is conducted in the step 71 to identify if the input of 5th bit is "1". In this manner the state of the switch SW5 shown in FIG. 7 is inspected to identify if the terminal is selected as the master terminal capable of emitting the command packet at the start of the system function. A MASTER FLAG is set in the RAM 44 if the input of 5th bit is "1" indicating the selection as the master terminal, and the MASTER FLAG is reset otherwise. Then the step 72 sets the 1st to 4th bits of the I/O controller 47 in the CHANNEL NUMBER AREA of the RAM 44, thus storing the address of the terminal determined by the switches SW1-SW4 in the RAM 44. The step 73 initiates the function of the event timer 45 and sets a LINE CHECK FLAG in the RAM 44. The step 74 identifies if the MASTER FLAG is set in the RAM 44, and, if so, sets "0" representing an empty packet in the output command register 29, or, if otherwise, terminates the power-on flow.

If the loop is in the normal state without any breakage, the master terminal receives the command packet generated by itself within the count-up time of the event timer 45. Also other terminals receive the command packet emitted by the master terminal within the count-up time of the event timer 45. Consequently, if the loop is in the normal state, the interruption controller 41 receives the command discrimination signal INT3 to activate the CPU 40 through the interruption port thereof. Also if the loop is broken, the event timer 45 counts up before the entry of the command packet, so that the count-up signal INT1 is given to the interruption controller 41 to activate the CPU 40.

Figures 1, 10A:
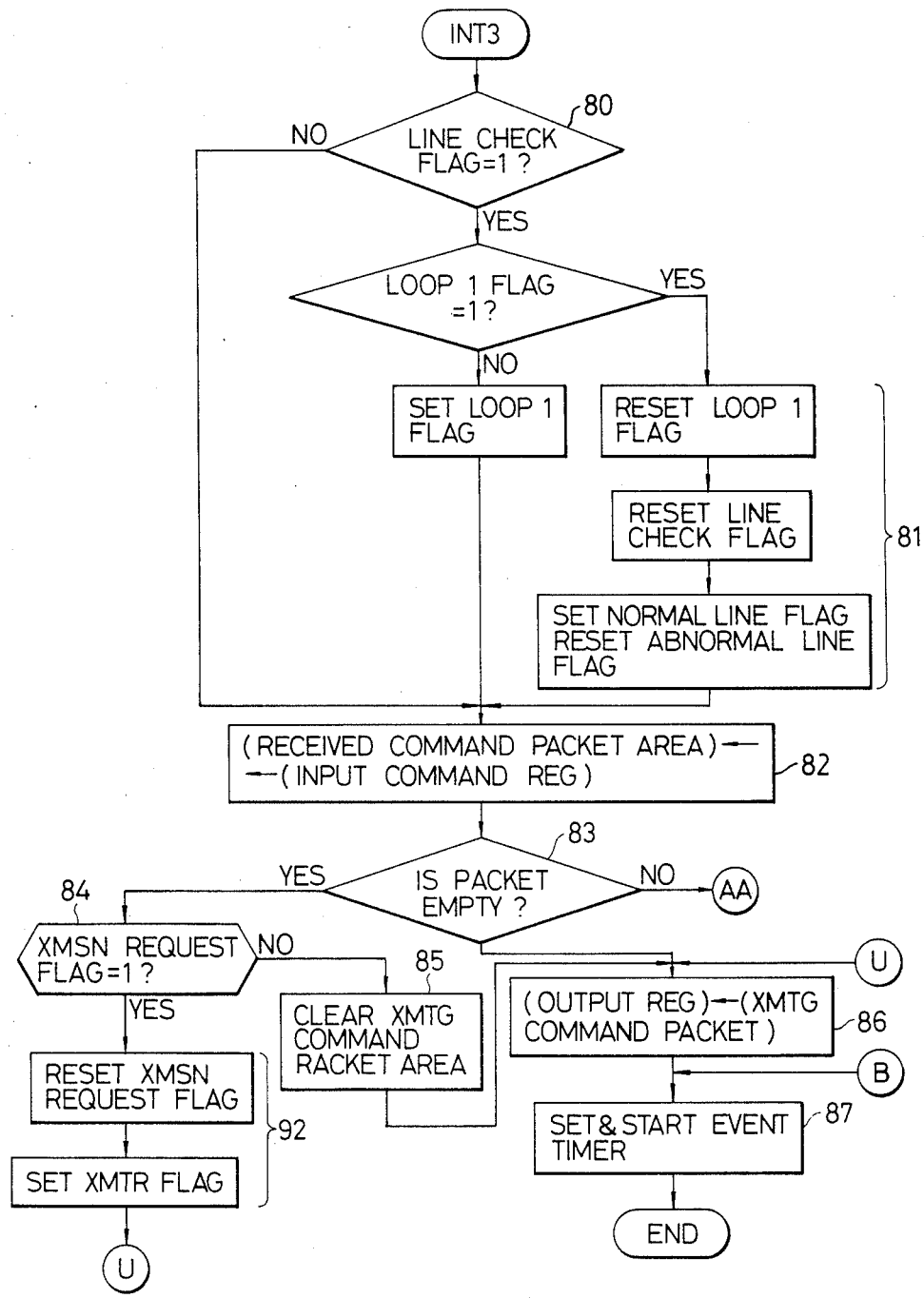
Figures 2, 10A:
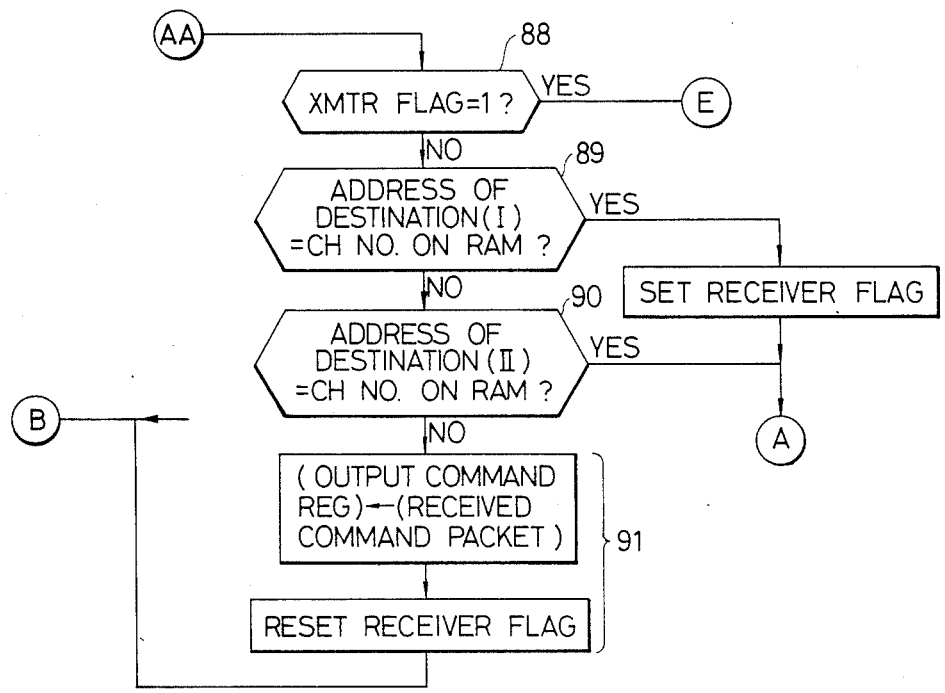

FIGS. 10A to 10J show a command discrimination signal interruption routine in response to the command discrimination signal INT3 indicating the entry of a command packet, and the detection of loop breakage is performed by the routine shown in FIG. 10A. In this program, the step 80 identifies the LINE CHECK FLAG set in the step 73 of the power-on flow shown in FIG. 9, and the program proceeds to the step 81 for setting a LOOP 1 FLAG indicating the entry of a command packet. The succeeding step 82 loads the command packet received in the input command register 27 into the RECEIVED COMMAND PACKET AREA of the RAM 44. The step 83 identifies if the command packet loaded in the RAM 44 is an empty packet. As it is so in this case, the program proceeds to the step 84 for inspecting the TRANSMISSION REQUEST FLAG indicating the presence of a request for transmission in the terminal. No such request is present in this case, the program proceeds to the step 85 for forming an empty packet in the TRANSMITTED COMMAND PACKET AREA of the RAM 44, and said packet is loaded in the output command register 29 in the step 86. The succeeding step 87 initiates the event timer 45 with a determined period, thus terminating the command discrimination signal interruption routine. Said routine is started again if the command packet is received again within the count-up time of the event timer 45. In this manner the detection for loop breakage is completed, and the loop is identified as normal. Then the step 81 resets the LOOP 1 FLAG in the RAM 44, resets the LINE CHECK FLAG, sets the LINE NORMAL FLAG and resets the LINE ABNORMAL FLAG. Subsequently the command packet received and loaded in the RAM 44 is analyzed, and, if a request for transmission is absent in the terminal, an empty packet is loaded in the output command register 29 and the event timer 45 is again activated.

Figure 11:
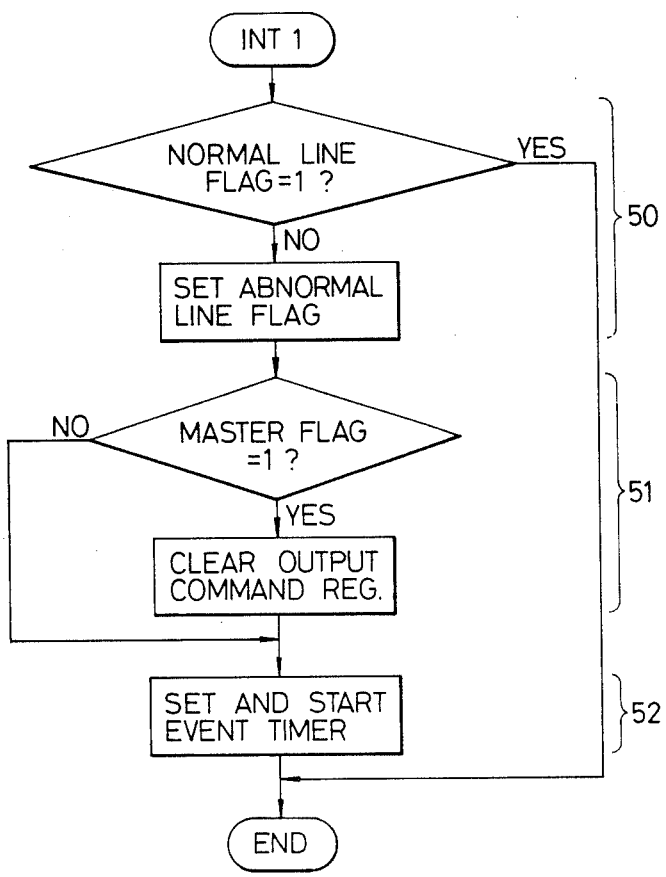
Figure 12A:
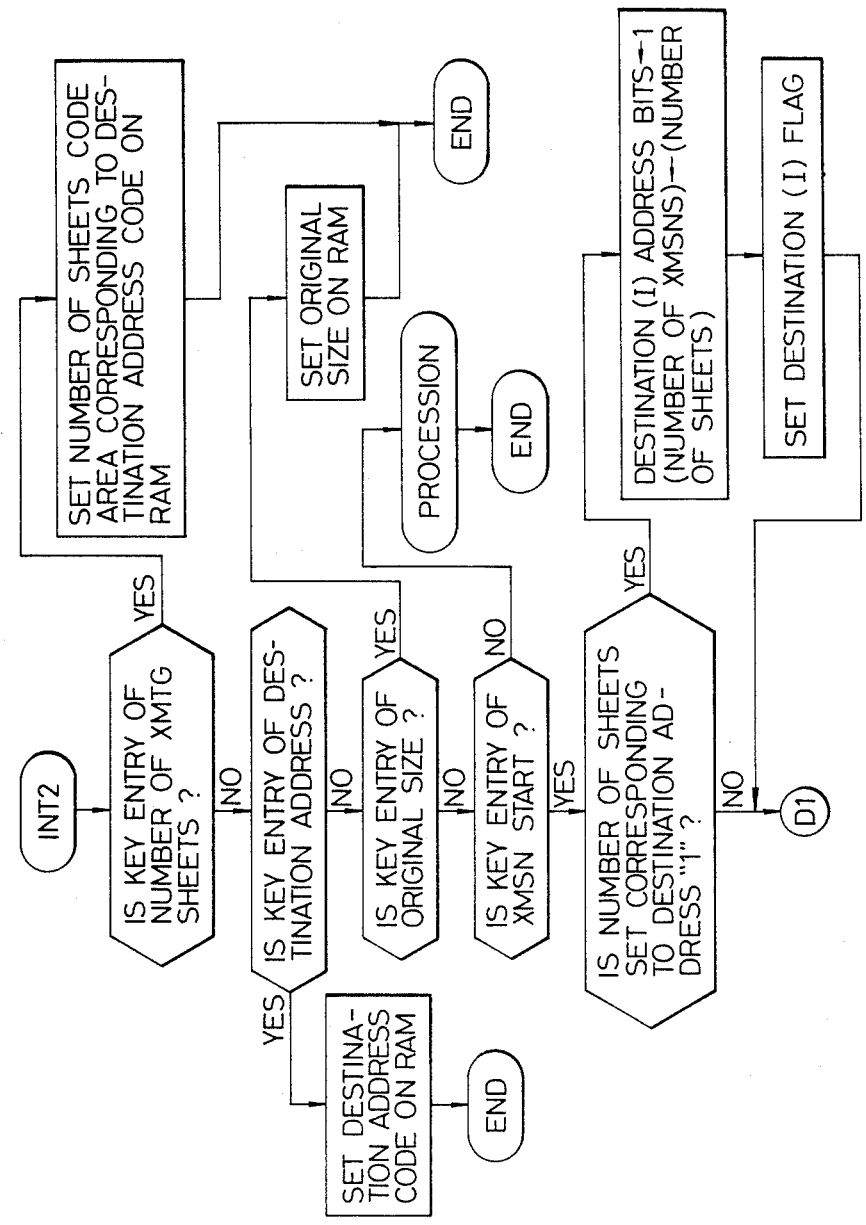
Figure 12B:
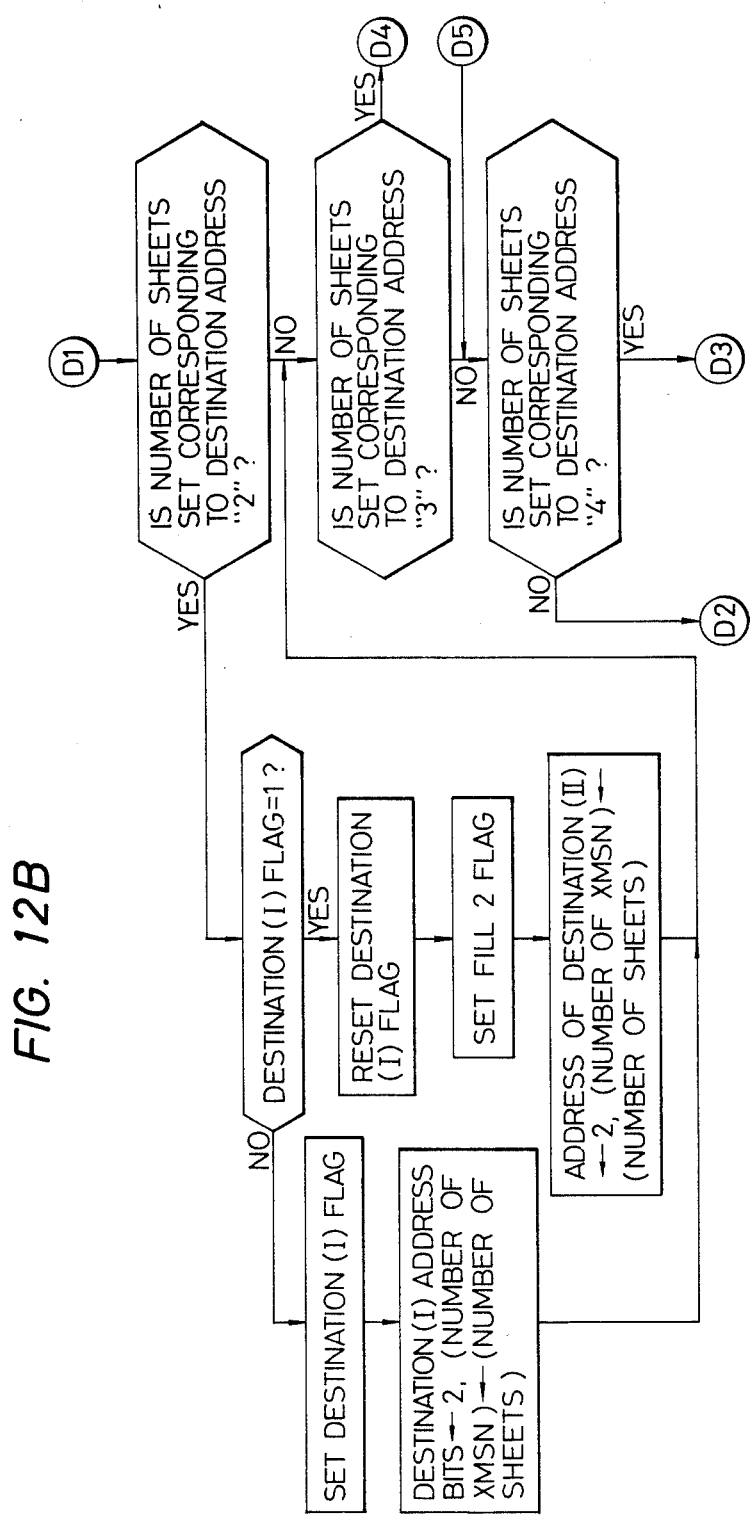
Figure 12C:
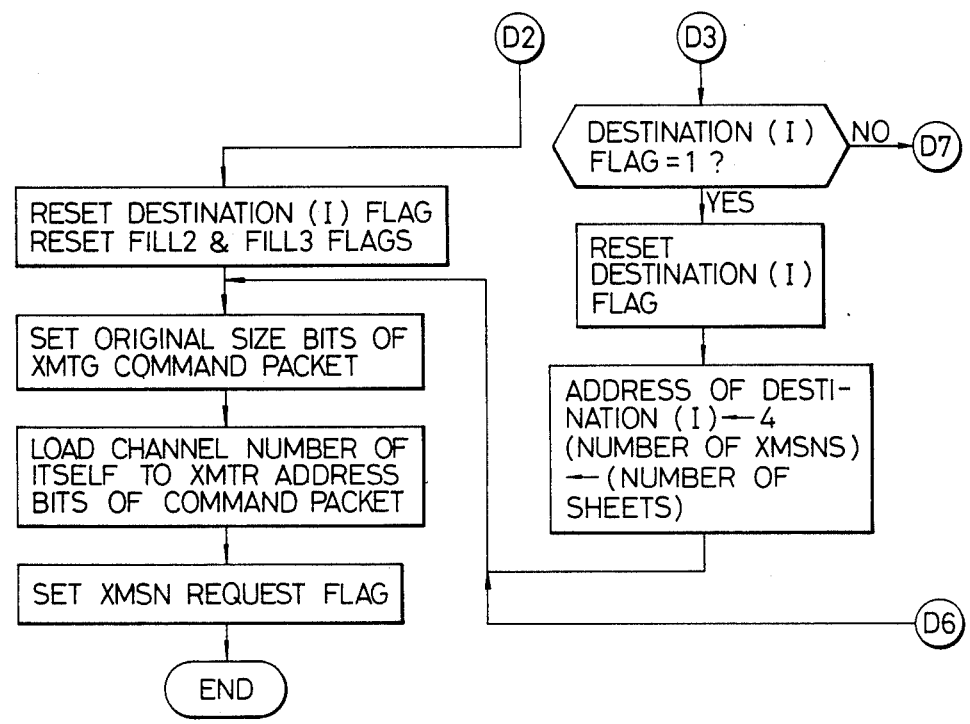
Figure 12D:
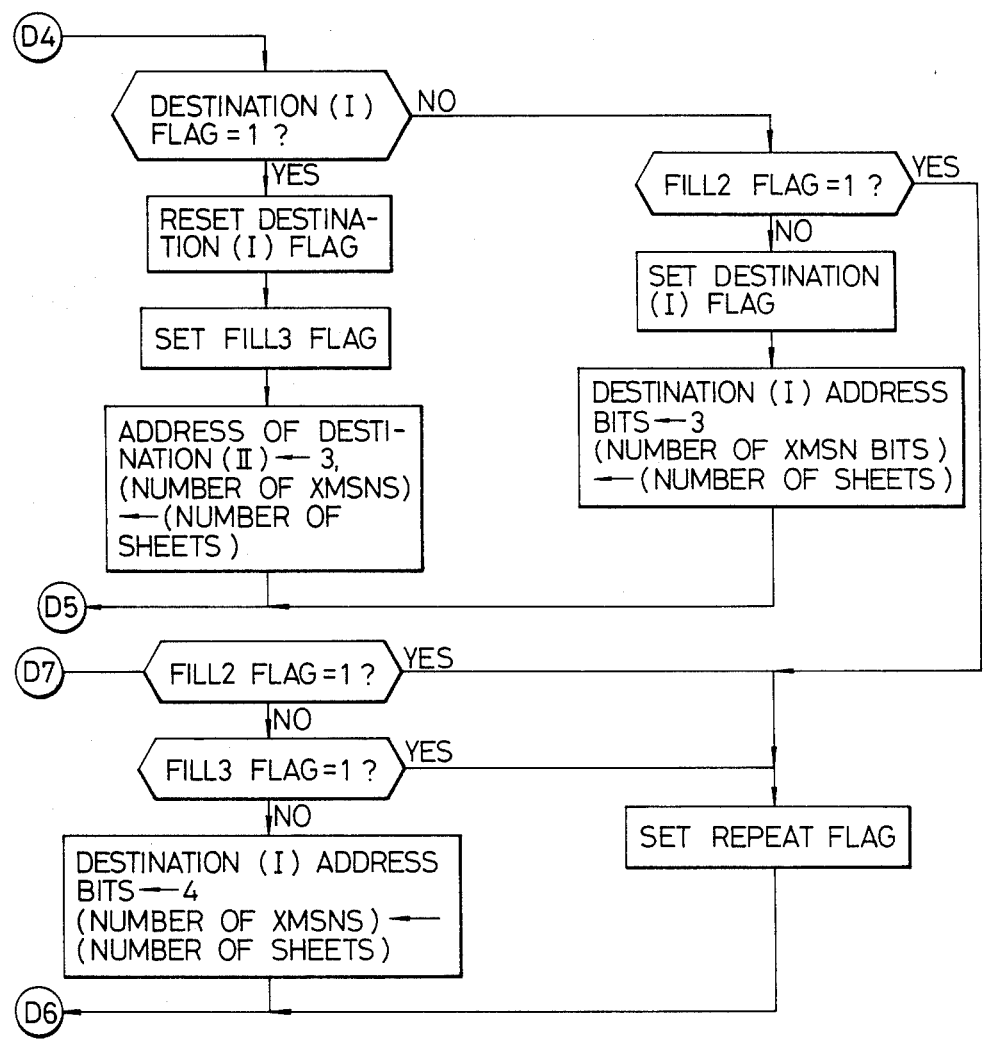

When the event timer 45 counts up, the count-up signal INT1 is supplied to the interruption controller 41 to call a timer interruption routine shown in FIG. 11. In case the loop is identified as normal by the routine shown in FIG. 10A, the LINE NORMAL FLAG is set in the RAM 44. In such case the step 50 terminates the timer interruption routine, identifying the entry of the command packet within the count-up time of the event timer.

However, if the LINE NORMAL FLAG is not set when the count-up time expires, the step 50 identifies the absence of entry of command packet before said expiration, and the program proceeds to the step 51 for inspecting the MASTER FLAG indicating that the terminal has been selected as the master terminal. If the MASTER FLAG is present, the program proceeds to the step 52 after setting an empty packet in the output command register 29. Also if the MASTER FLAG is absent, the program merely proceeds to the step 52 with such empty packet setting. The step 52 initiates the function of the event timer 45 with a determined time. In this manner, if the count-up time expires before the entry of the command packet in the master terminal, an empty command packet is again emitted and the event timer 45 is activated at the same time. Also other terminals start the event timers in such case. The detection for loop breakage is repeated in this manner, and a breakage in the loop is finally identified only if normal entry of the command packet is not obtained in the repeated detections. In such case an alarm on each terminal is activated. Since each terminal in the system detects the loop breakage in the aforementioned manner, the position of the breakage can be exactly determined.

FIG. 12 shows a key-in interruption routine in response to a key-in signal INT2 indicating a key actuation in the operation unit 46, which is utilized for entering the destination of the image information, number of images to be transmitted, size of said images and an instruction for starting the transmission.

At first the entered key information is stored in a corresponding area of the RAM 44. In case the destination address keys are actuated, the corresponding address code is stored in the RAM 44. In case the image number keys are actuated, the number of images is set in the IMAGE NUMBER CODE AREA corresponding to the destination address in the RAM 44. Similarly the image size is set in the ORIGINAL SIZE AREA. In response to the actuation of the transmission start key after the above-mentioned three data are entered, the ADDRESS AREAS 1-4 are inspected in this order to identify the number of images corresponding to said address areas. Then the first destination address having a corresponding image number is set in the address bits of the first destination in the TRANSMITTED COMMAND PACKET AREA in the RAM 44, and the corresponding image number is set in the image number bits. Also the second destination address having a corresponding image number is set in the address bits of the second destination in the TRANSMITTED COMMAND PACKET AREA in the RAM 44, and the corresponding image number is set in the image number bits. If further image number is found in another destination, the REPEAT FLAG is set in the RAM 44. Also if such image number is no longer found, the original size bit and the transmitter address bits are appropriately set in the TRANSMITTED COMMAND PACKET AREA. Then the TRANSMISSION REQUEST FLAG in the RAM 44 is reset. In this manner a command packet to be released in response to an empty packet is prepared in the TRANSMITTED COMMAND PACKET AREA of the RAM 44, according to the destination addresses, image numbers, original size etc. entered from the operation unit 46. The FILL 2 FLAG indicates that the TRANSMITTED COMMAND PACKET AREA of the RAM 44 contains information on the terminals of the addresses 1 and 2, and the FILL 3 FLAG indicates that said area of the RAM 44 contains information on the terminals of the addresses 1 and 3, or 2 and 3.

In response to the entry of an empty packet into a terminal in which a command packet is formed in the TRANSMITTED COMMAND PACKET AREA and the TRANSMISSION REQUEST FLAG is set in the RAM 44, the command discrimination signal INT3 is generated to call the command discrimination signal interruption routine, whereby said terminal acquires the position as transmitter and initiates a protocol for the image transmissions to the destinations.

In the following there will be explained the function of such transmitting terminal.

Now reference is again made to the command discrimination signal interruption routine shown in FIGS. 10A-10J. As explained in the foregoing, in response to the entry of an empty packet to a terminal in which a command packet is formed in the TRANSMITTED COMMAND PACKET AREA and the TRANSMISSION REQUEST FLAG is set in the RAM 44, the command discrimination signal INT3 is generated to call the routine shown in FIG. 10A. Since the LINE CHECK FLAG is already set, the program proceeds to the step 82 to load the command packet entered in the command register into the RECEIVED COMMAND PACKET AREA of the RAM 44. The succeeding step 83 identifies said packet as an empty packet, and the step 84 inspects the presence of the TRANSMISSION REQUEST FLAG. Confirming the presence of said flag, the program proceeds to the step 92 for resetting the TRANSMISSION REQUEST FLAG in the RAM 44 and setting the TRANSMITTER FLAG in the RAM 44 indicating that the terminal is selected as the transmitter. The succeeding step 86 loads the command packet, already formed in the TRANSMITTED COMMAND PACKET AREA of the RAM 44 in response to the data from the operation unit, into the output register 29. Simultaneously with the transmission of said command packet, the step 87 starts the event timer with a determined count-up time, thus terminating the routine shown in FIG. 10A. In this manner the command packet, including data for destinations, corresponding image numbers, transmitter, original size and circuit connection, is transmitted through the loop, and the transmitting terminal awaits the re-entry of said command packet after circulation through all other terminals.

Upon said re-entry, the command discriminating signal INT3 is generated to call the routine shown in FIG. 10A. The received command packet bears the data concerning the transmission and the responses from the destinations. The step 82 loads said packet in the RAM 44, then the step 83 identifies said packet as a non-empty packet, and the program proceeds to the step 88. Then, since the TRANSMITTER FLAG is set in the RAM 44, the program proceeds further to (E) in FIG. 10C. Subsequently the step 101 inspects the bits indicating the readiness for reception, start of transmission and completion of transmission in the command packet stored in the RECEIVED COMMAND PACKET AREA of the RAM 44. As these three bits are not set in this state, the program proceeds to the step 102 for inspecting the response bits from the first and second destinations. If any of these bits are in the set state, the program proceeds to the step 103 after resetting said bits. If none are in the set state, the program again proceeds to the step 103 after resetting the IMAGE NUMBER CODE AREAS of the RAM 44 corresponding to such destinations and resetting said response bits. The step 103 identifies if the REPEAT FLAG has been set in the RAM 44 in the key-in interruption routine shown in FIG. 12. If the REPEAT FLAG is present indicating the presence of an image number setting at another destination, the program proceeds to the step 104 to inspect if the FILL 2 FLAG has been set, thus confirming the destinations set in the preceding command packet. If said FILL 2 FLAG is set, indicating that the data corresponding to the addresses 1 and 2 have been set in the preceding command packet, the step 105 inspects if the image number setting is present at the address 3 and/or 4. If the image number settings are present at both addresses, the address 3 and the corresponding image number are respectively set as the first destination and the corresponding image number in the RECEIVED COMMAND PACKET in the RAM 44, and the address 4 and the corresponding image number are respectively set as the second destination and the corresponding image number in said RECEIVED COMMAND PACKET AREA. Also if an image number setting is found at the address 3 or 4, said address and the corresponding image number are respectively set as the first destination and the corresponding image number in said RECEIVED COMMAND PACKET AREA. After resetting the FILL 2 or FILL 3 FLAG, the program proceeds to the step 106 for resetting the REPEAT FLAG and to (U) for loading the command packet in the RAM 44 into the command register 29 and starting the event timer 45. However, if the REPEAT FLAG has not been set in the step 103, the program proceeds to the step 107 for inspecting the presence of image number settings at the destinations 1-4 in the RAM 44. If an image number setting is present indicating that the terminal is selected as the transmitter, the program proceeds to the step 108 for setting a bit for asking the readiness for reception in the RECEIVED COMMAND PACKET AREA in the RAM 44. Then the step 109 sequentially identifies if the image number settings are present in the areas corresponding to the destination addresses. If such settings are present, the corresponding addresses are set in the address bits of the first and second destinations in the RECEIVED COMMAND PACKET AREA in the RAM 44, according to the flow charts shown in FIGS. 10D-10G. The REPEAT FLAG is set if three or more image number settings are found. Then the program proceeds to (U) to load the command packet of the RAM 44 into the output command register 29 and to start the event timer 45. In this manner a command packet, having bits for asking the preparation for reception, is released to the loop, and the transmitting terminal awaits the re-entry of said command packet.

When the command packet is received, the command discrimination signal INT3 is generated to call the routine shown in FIG. 10A. If the response bit indicating the readiness for reception is set in the received command packet, the program proceeds from the step 101 in FIG. 10C to (P) in FIG. 10H. However if the step 101 identifies that said bit is not set, the received command packet is loaded in the output command register 29 and the program returns to (U) for emitting the same command packet. In case said response bit is properly set, the step 111 resets said response bit and the succeeding step 112 identifies if the REPEAT FLAG has been set in the RAM 44. If it is not set, the step 113 is executed to reset the ready-to-receive bit in the received command packet and sets the start-transmission bit, and the program proceeds to (Q) shown in FIG. 10C. Subsequently the step 105 is executed to sequentially identify if image number settings are present in the areas of the RAM 44 corresponding to destination addresses. After setting said addresses in the RECEIVED COMMAND PACKET AREA, the program returns to (U) to release the command packet set in the RAM 44. In case the REPEAT FLAG is found in the step 112, the step 114 is executed to identify if the FILL 2 FLAG has been set. If said flag is present indicating that the bits asking the readiness for reception to the destinations 1 and 2 were set in the preceding command packet and that the response to said asking bits were obtained, the step 115 is executed to identify if image number settings are present at the addresses 3 and 4. Then said addresses are set in the address bits for the first and second destinations in the RAM 44, the REPEAT FLAG is reset, and the program returns to (U) to release the command packet having bits for asking the readiness for reception to new destinations.

Figures 1, 10B:
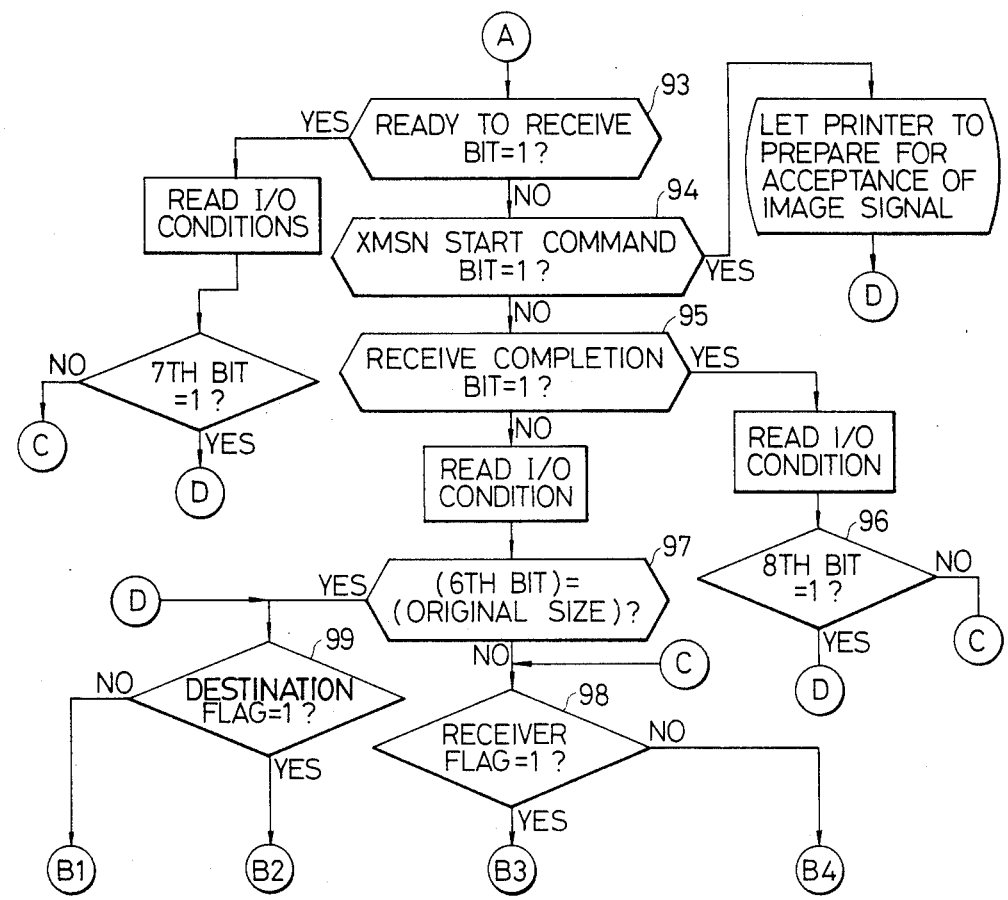
Figures 2, 10B:
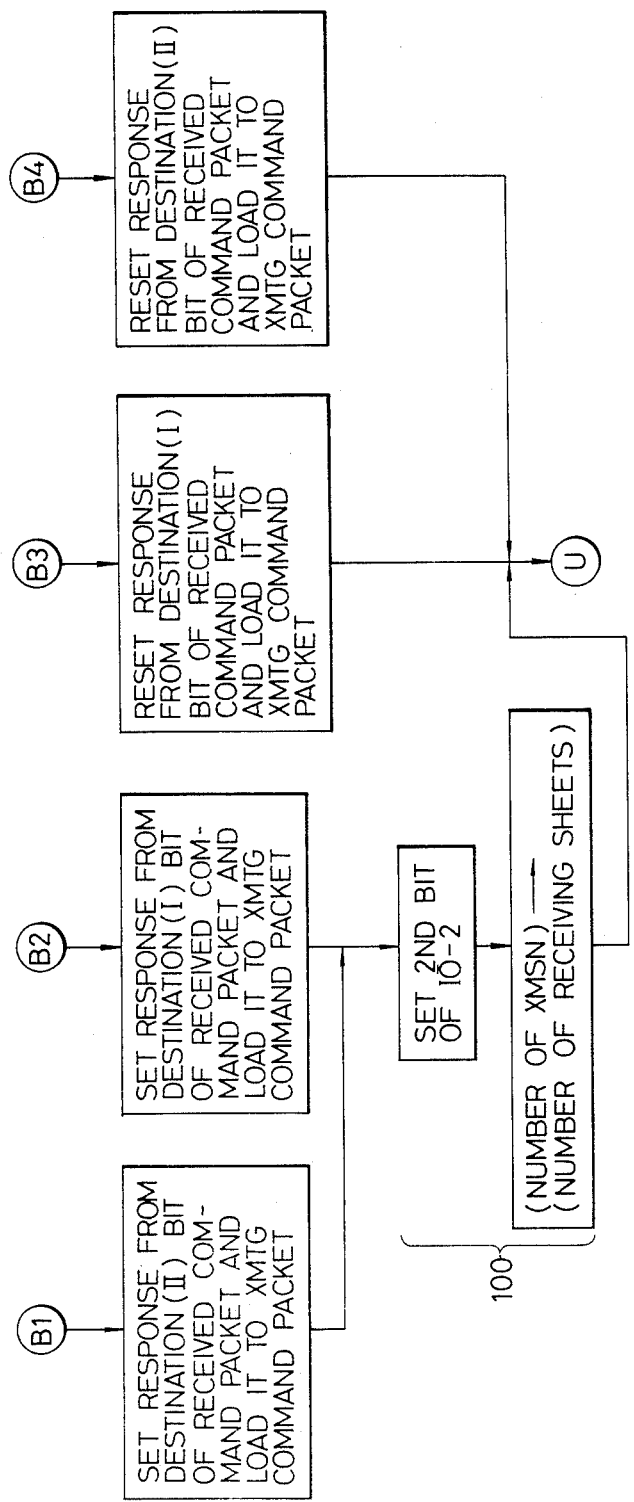
Figures 1, 10C:
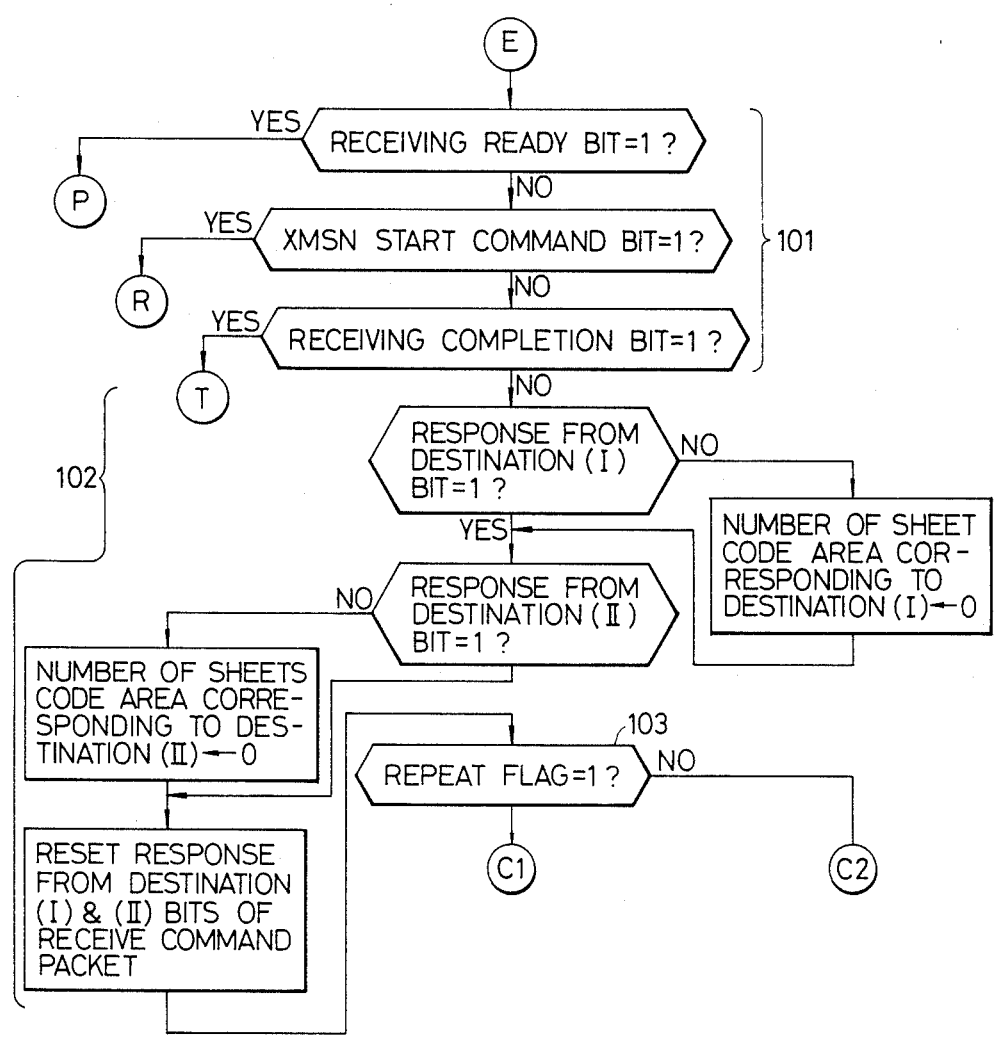
Figures 2, 10C:
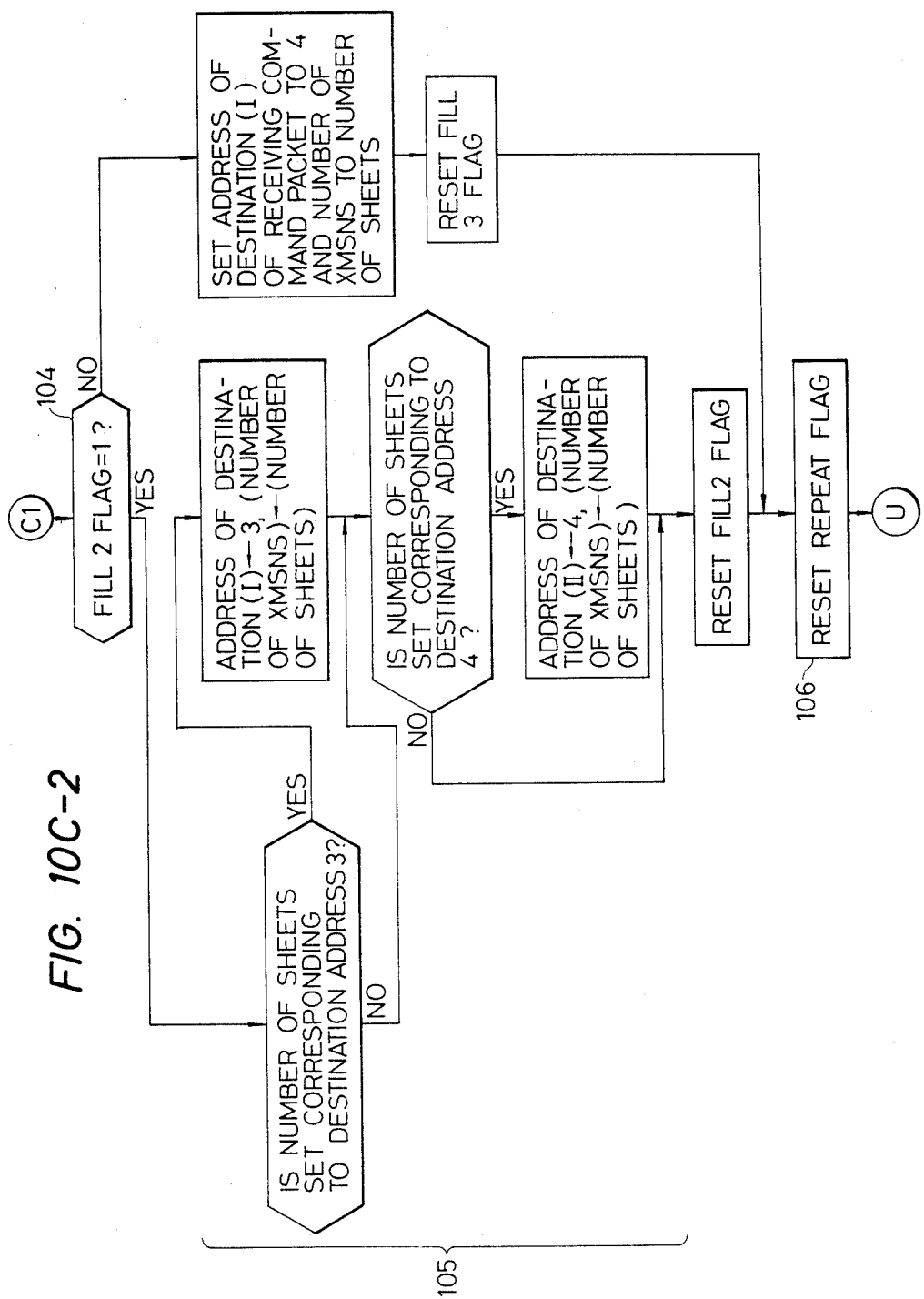
Figures 3, 10C:
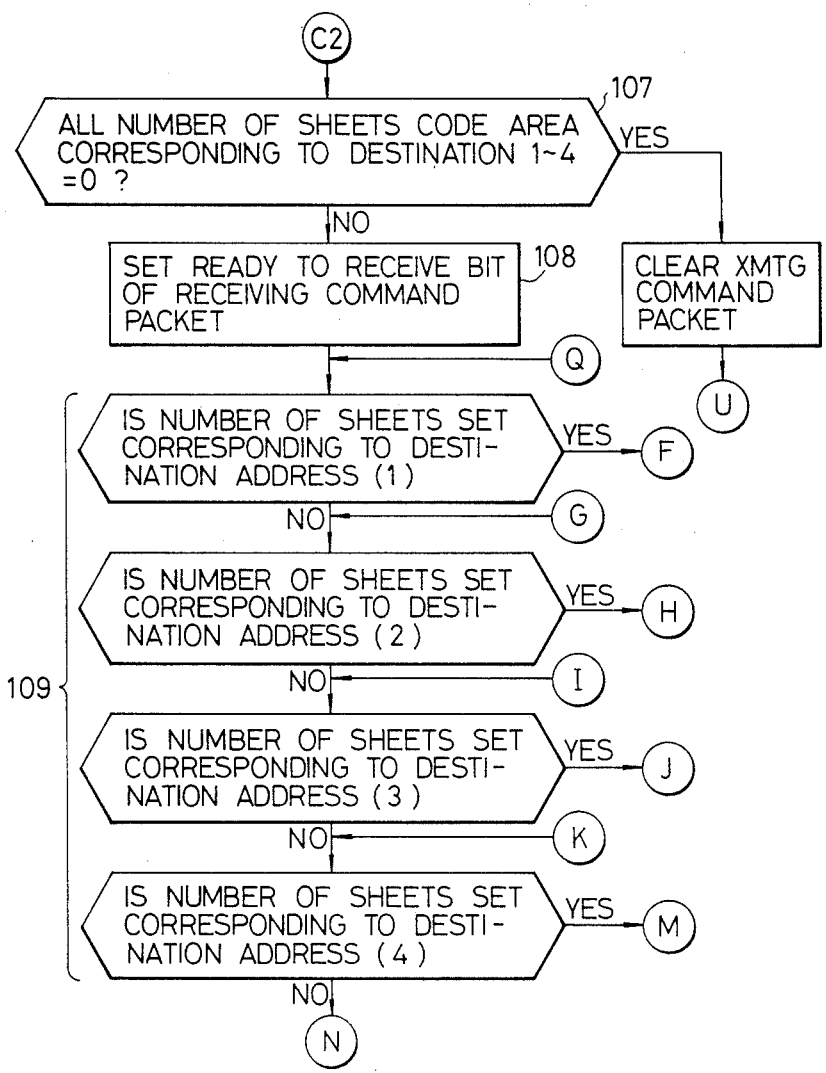
Figure 10D:
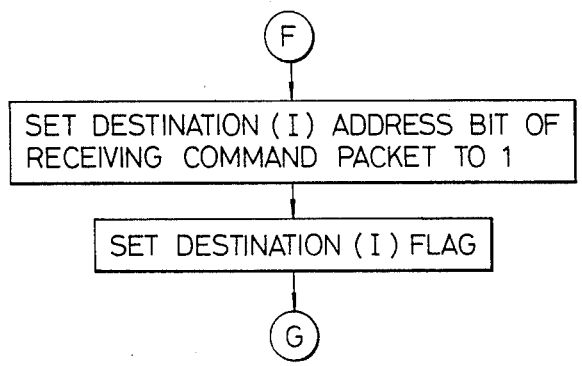
Figure 10E:
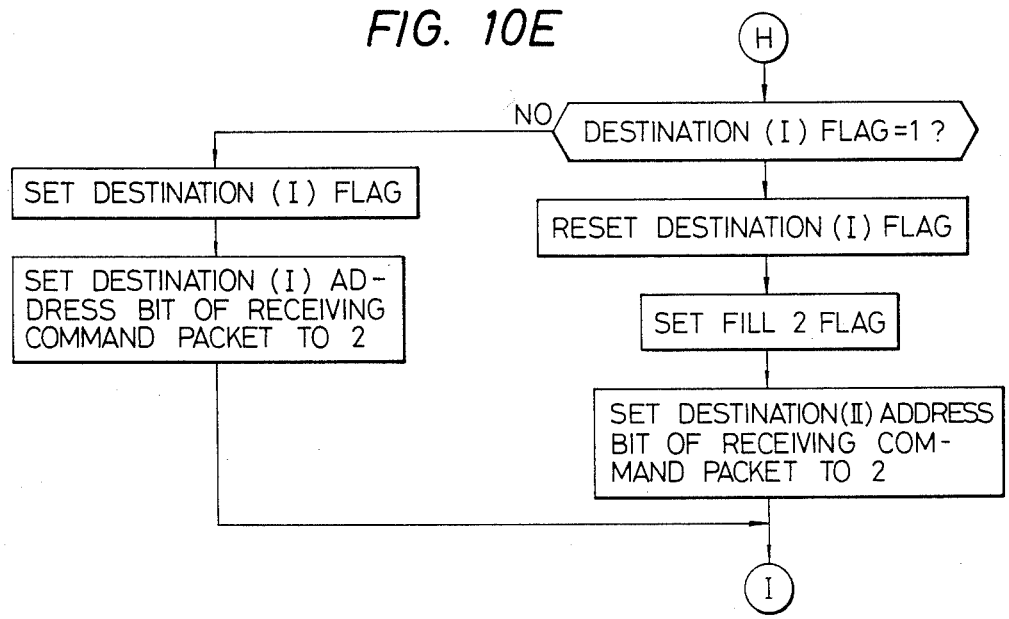
Figure 10F:
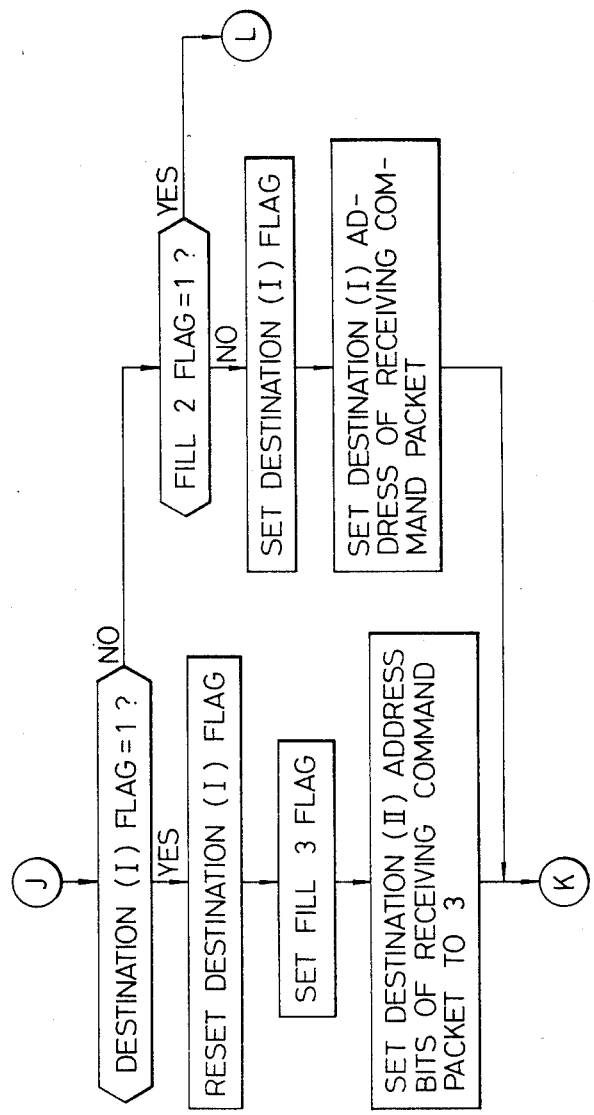
Figure 10G:
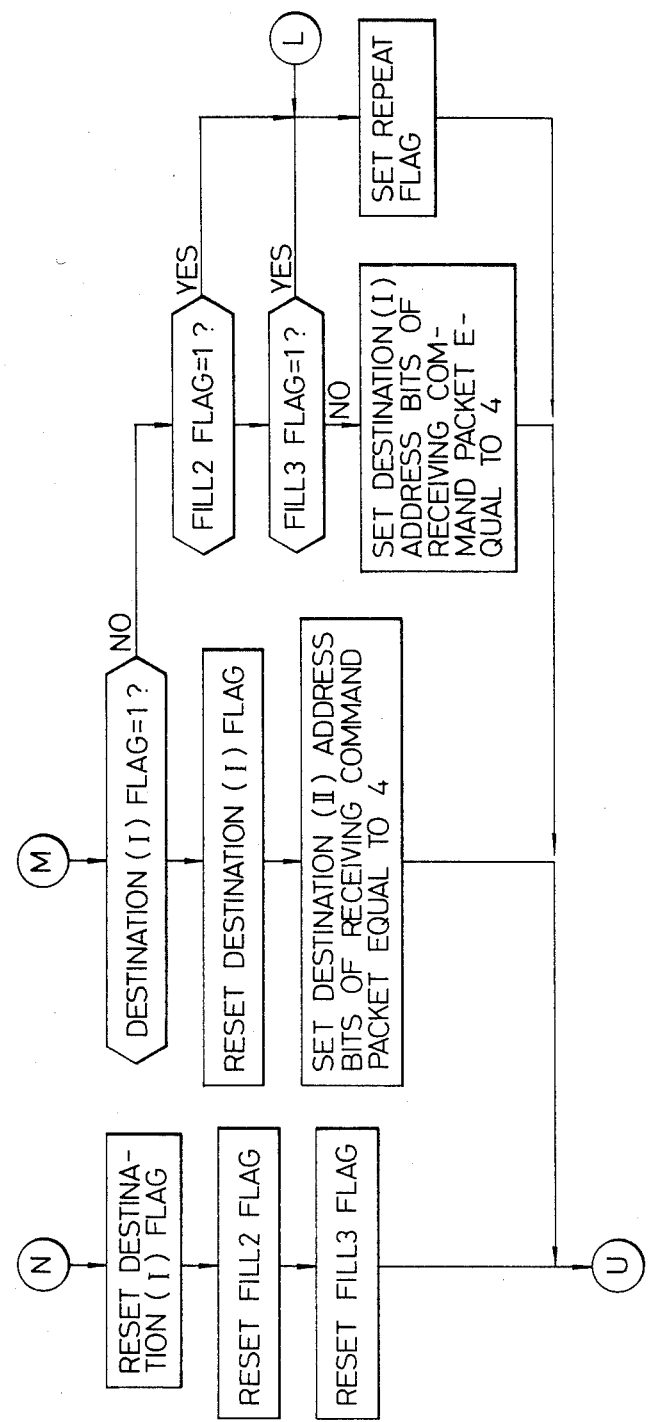
Figures 1, 10H:
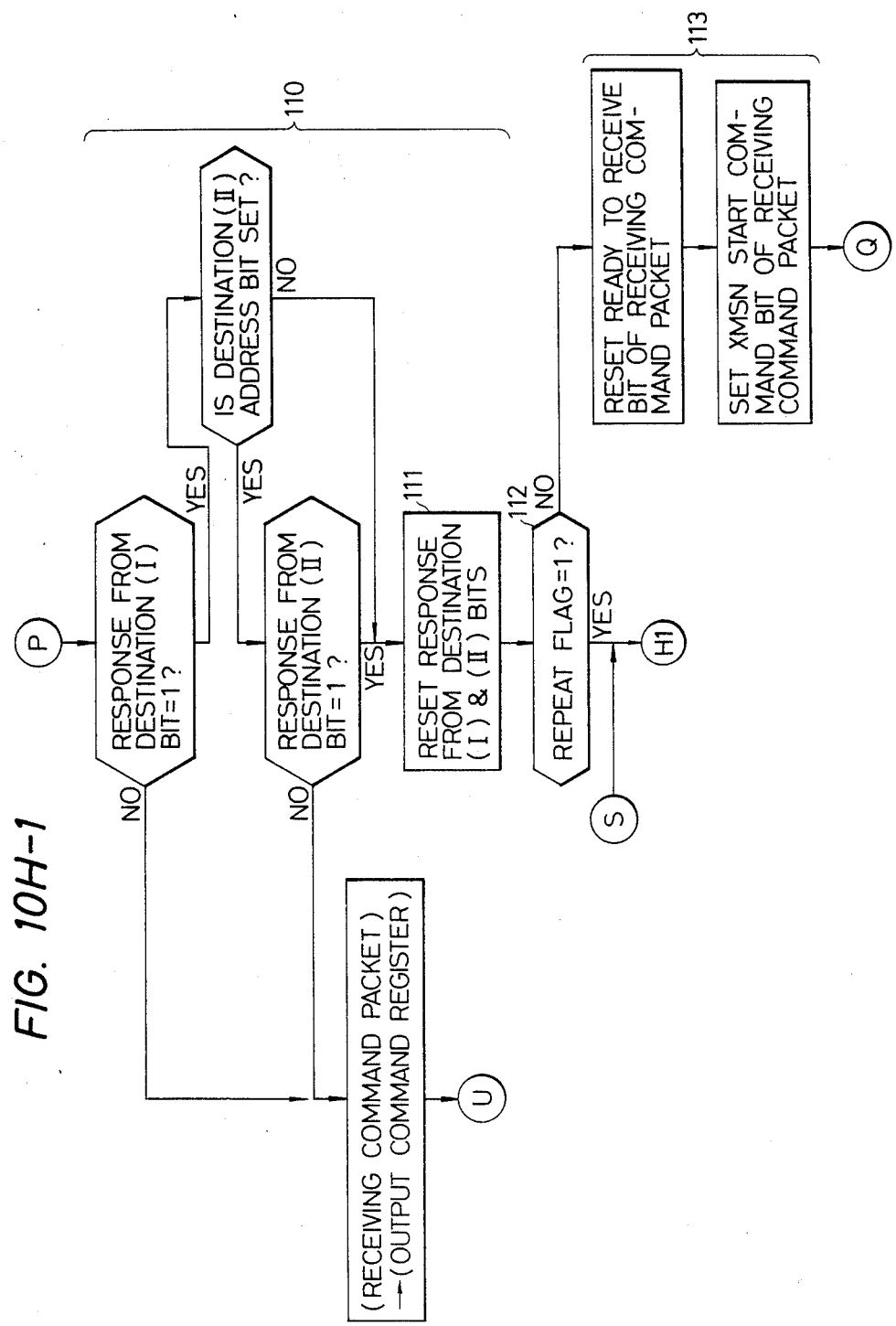
Figures 2, 10H:
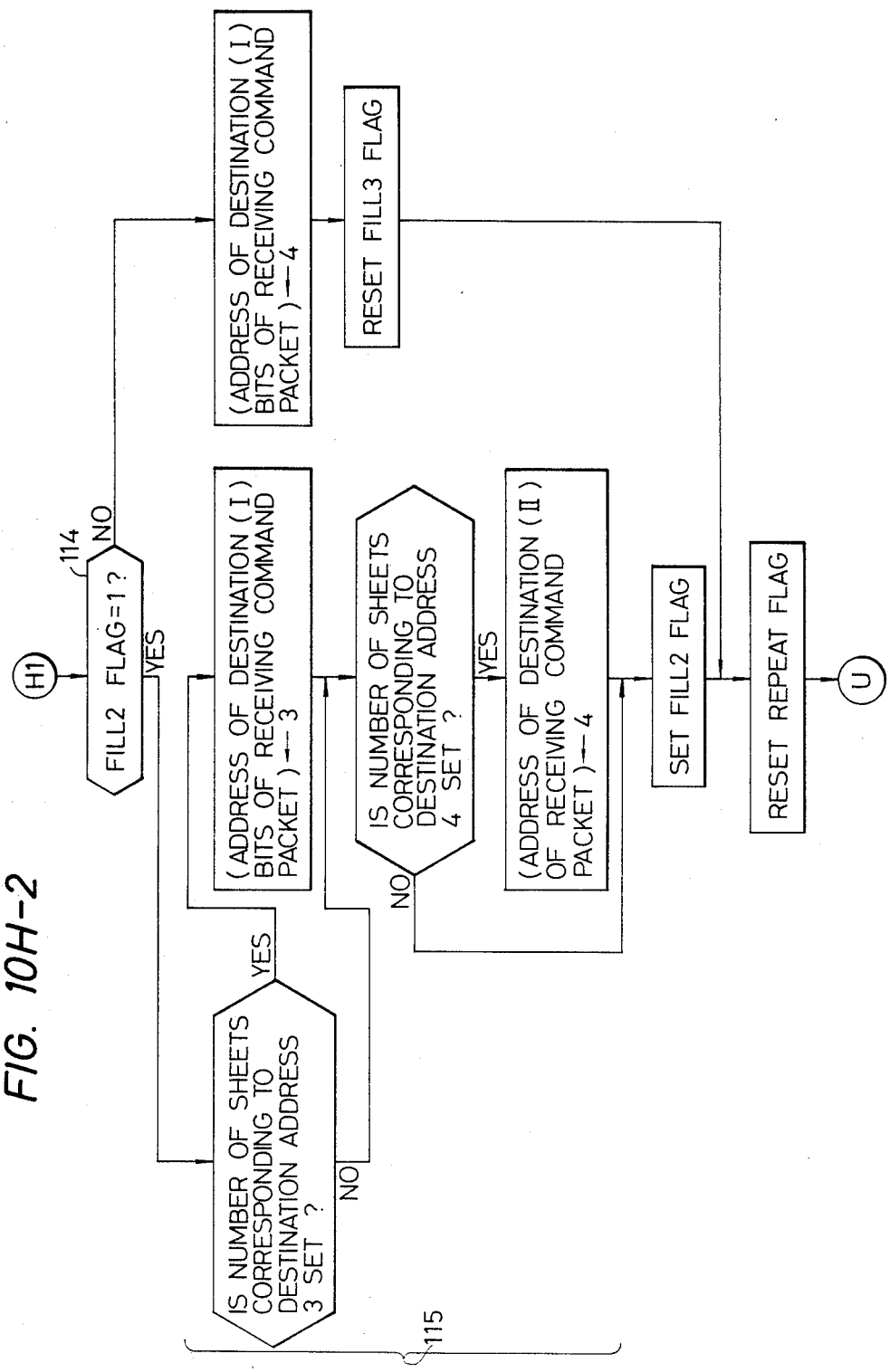
Figure 101:
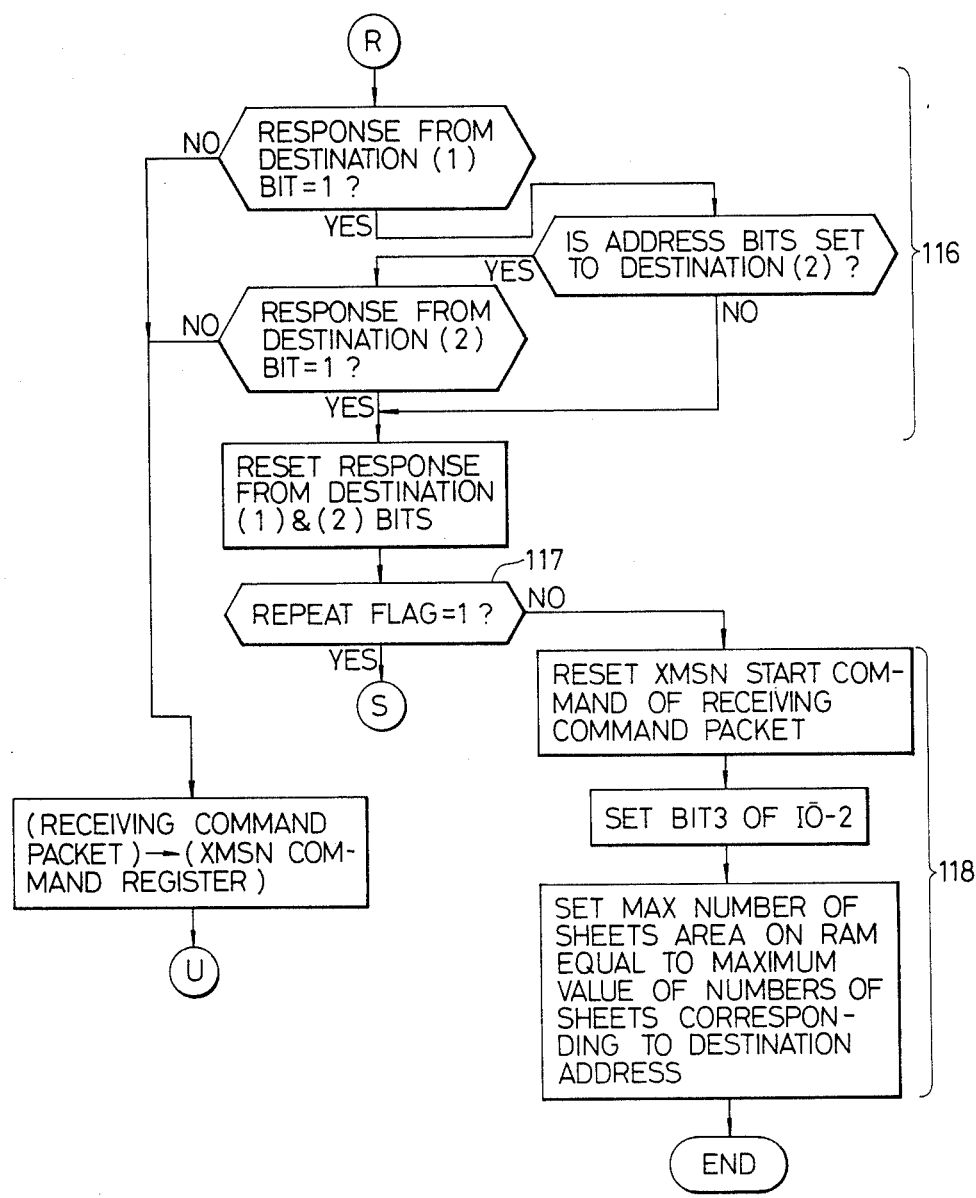
Figure 10J:
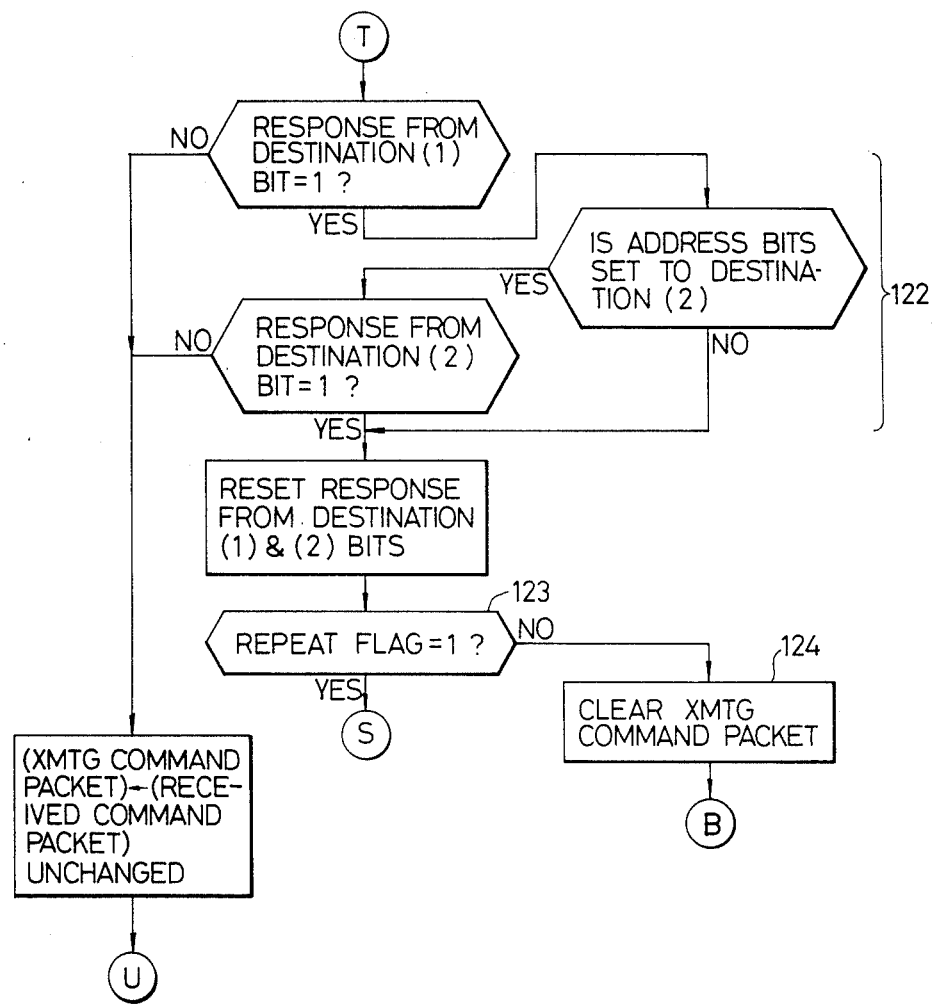

When a command packet including the start-transmission bit is received, the command discrimination signal INT3 is generated to call the routine shown in FIG. 10A, and the program then proceeds from the step 101 in FIG. 10C to (R) in FIG. 10I. In the flow shown in FIG. 10I, the step 116 identifies if the response bit to the start-transmission signal is already set, and, if not, the program returns to (U) to again release the same command packet. On the other hand, if said response bit is set, the step 117 is executed to identify if the REPEAT FLAG has been set. If the REPEAT FLAG is set the program proceeds to (S) shown in FIG. 10H. If not, the program proceeds to the step 118 for resetting the start-transmission bit of the RECEIVED COMMAND PACKET AREA in the RAM 44 and setting the third bit of I/O2 for activating the reader. Then the largest image number among those set in the RAM 44 corresponding to the destination addresses is set in the MAXIMUM IMAGE NUMBER AREA in the RAM 44.

In this manner the transmitting terminal initiates the image transmission upon confirmation of the response from the destination to the start-transmission signal from said transmitting terminal.

Thus an image packet formed by reading an original document is released by the transmitting terminal. When said image packet re-enters the transmitting terminal after circulating through the loop, the image discrimination signal INT4 is generated to call the image discrimination signal interruption routine shown in FIG. 13. In the transmitting terminal, the step 120 is executed to subtract 1 from the MAXIMUM IMAGE NUMBER AREA, and, if the content thereof becomes zero indicating the completion of transmission of image packets, the program proceeds to the step 121 for resetting the third bit of the I/O2 thereby terminating the function of the reader and setting the bit for asking the completion of reception in the RECEIVED COMMAND PACKET AREA. Thereafter the program proceeds to (Q) in FIG. 10C. After setting the terminal address corresponding to the image number setting to the first or second destination on the RECEIVED COMMAND PACKET AREA in the step 105, the program returns to (U) for releasing the command packet set in the RAM 44. Also if the MAXIMUM IMAGE NUMBER AREA does not reach zero in the step 120, the emission of the image packet is repeated.

After the MAXIMUM IMAGE NUMBER AREA reaches zero and the command packet including the bit for asking the completion of reception is transmitted, the transmitting terminal awaits the packet including the response from the destination. Upon receipt of said packet, the command discrimination signal INT3 is generated to call the command discrimination signal interruption routine shown in FIG. 10A, and the program proceeds to (E) in FIG. 10C. The step 101 identifies the receipt of command packet including the bit for asking the completion of reception, and the program proceeds to (T) in FIG. 10J. In the flow chart shown in FIG. 10J, the step 122 identifies the presence of the response bit to the asking bit, and, if not present, the program returns to (U) to release the preceding command packet again. In case of the presence of said response bit, the program proceeds to the step 123 to identify if the REPEAT FLAG has been set. If said flag is present, the program proceeds to (S) in FIG. 10H to ask the completion of reception to other destinations. If said flag is not set, the program proceeds to the step 124 for resetting the TRANSMITTED COMMAND PACKET AREA to zero and proceeds to (B) in FIG. 10A. In this manner the image transmission from the transmitting terminal is completed, and an empty packet is again circulated through the loop.

In the following there will be explained the function of a terminal selected as the destination.

Let us consider a case where a command packet bearing data for selecting the destinations is transmitted from the transmitting terminal to another terminal after the checking of the loop status. In response to said packet the command discrimination signal INT3 is generated to call the command discrimination signal interruption routine in FIG. 10A. Since the LINE CHECK FLAG is already reset, the program proceeds through the step 80 to the step 82 to load the received command packet in the RECEIVED COMMAND PACKET AREA of the RAM 44. Then the program proceeds from the step 83 to the step 88, and further to the step 89 since the terminal in question is not the transmitter. The step 89 identifies if the address bits of the first destination in the received command packet coincide with the channel number of the terminal stored in the RAM 44. If the two mutually coincide, the DESTINATION FLAG is set in the RAM 44 and the program proceeds to (A) in FIG. 10B. If said channel number does not coincide with the address bits of the first destination, the step 90 is executed to identify the coincidence with the address bits of the second destination, and, in case of coincidence, the program proceeds to (A) in FIG. 10B. In case of non-coincidence, indicating that the terminal is not selected as the first nor second destination, the program proceeds to the step 91 to load the received command packet into the output command register 29 without change and to reset the DESTINATION FLAG mentioned above. Then the step 87 is executed to start the event timer with a determined count-up time and to release the packet. On the other hand, in case the terminal is selected as the first or second destination, the program proceeds to (A) in FIG. 10B, and the steps 93-95 are executed to identify the enquiries in the received command packet.

In case the packet asks the readiness for reception, the I/O1 is read to identify thesstatus of the 7th bit indicating if the printer is ready for operation. In case the printer is ready, the program proceeds to (D) to identify, in the step 99, if the DESTINATION FLAG has been set. If said flag is present indicating that the terminal is selected as the first destination, the response bit for the first destination is set in the received command packet. Also in case the DESTINATION FLAG is not present indicating that the terminal is selected as the second destination, the response bit for the second destination is set in the received command packet. Then after setting the 2nd bit of the I/O2 for the preparation of the print operation and loading the instructed image number in the IMAGE NUMBER AREA of the RAM 44, the program proceeds to (U) in FIG. 10A, thus releasing the packet and starting the event timer. However, in case the printer is not ready, the program proceeds to (C) then to (U) in FIG. 10A, thereby emitting the received command packet without the setting of the aforementioned response bit.

If the received command packet instructs the start of transmission, the step 94 is executed to prepare the printer for receiving the image transmission, and the program proceeds to (D) for setting the response bit.

If the received command packet asks the completion of reception, the I/O1 is read in the step 95 to identify the status of the 8th bit indicating if the print operation is completed. If the print operation is completed, the program proceeds to (D) to set the corresponding response bit. If not, the program proceeds to (C) without said response bit setting.

In case the received command packet does not correspond to any of the foregoing three cases, the I/O1 is read in the step 97 to identify if the status of the 6th bit indicating the recording sheet size set on the printer coincides with the size designated by the received command packet. If both sizes coincides mutually the program proceeds to the step 99 to set the corresponding response bit but in case both sizes are mutually different the command packet is released without the response bit.

The image packet is transmitted when the command packet, including the response bit to the start-transmission signal, is confirmed at the transmitting terminal, according to the routine shown in FIG. 10B.

Figure 13:
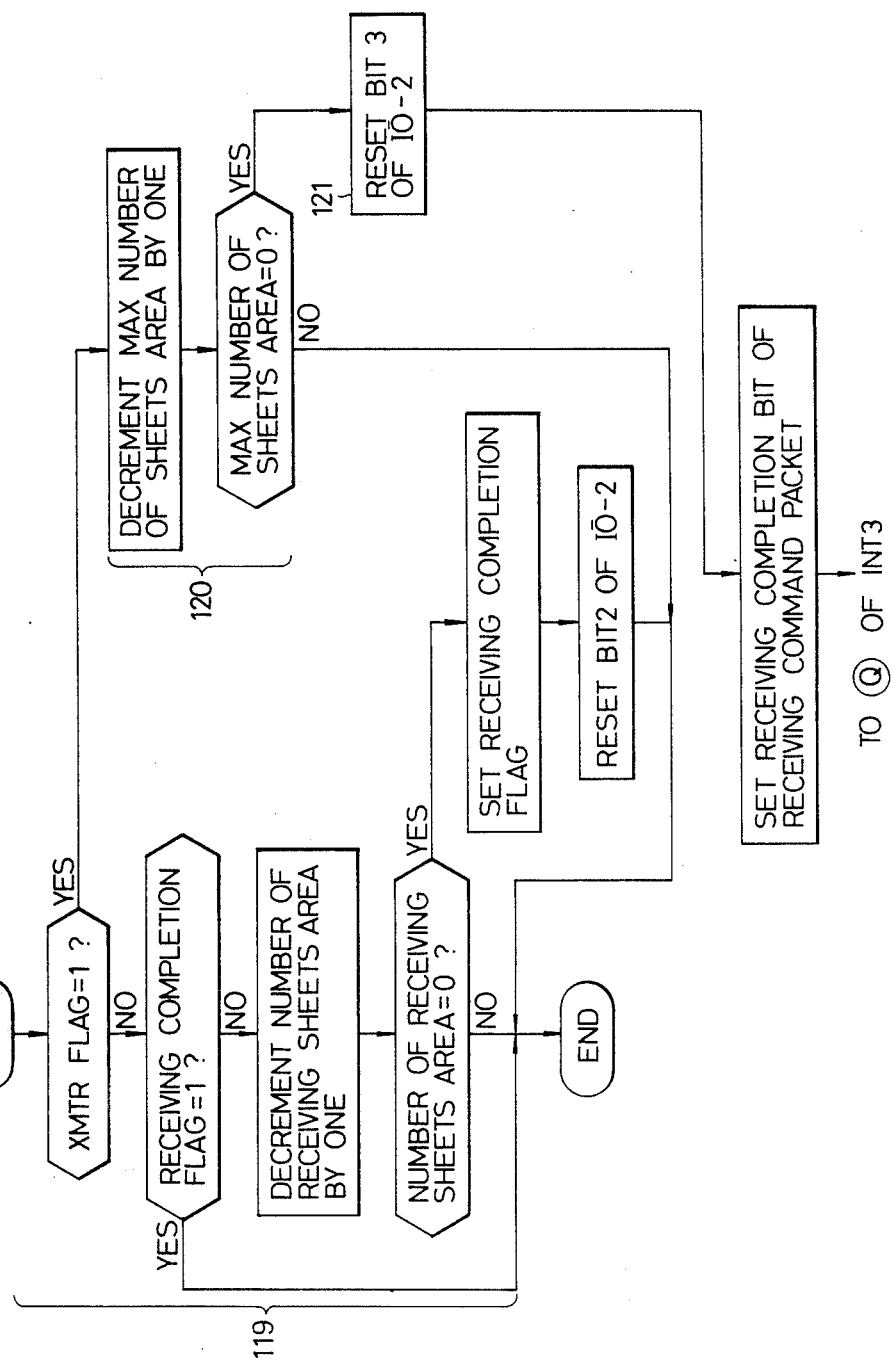

Upon receipt of the image packet by the destination, the image discrimination signal INT4 is generated to call the image discrimination signal interruption routine shown in FIG. 13. In the step 119, the TRANSMITTER FLAG is not set since the terminal in question is selected as a destination. Also the RECEPTION COMPLETION FLAG is not set in the RAM 44 unless the image packets of a number equal to the image number setting have been received. Thus the content of the RECEIVED IMAGE NUMBER AREA in the RAM 44 is step decreased, and inspection is made if said content has reached zero. If said content is zero, the RECEPTION COMPLETION FLAG is set in the RAM 44, and the 2nd bit of the I/O2 for providing output signals for the print operation is reset.

As explained above, the destination terminal decreases 1 from the RECEIVED IMAGE NUMBER AREA of the RAM 44 in response to a received image packet, and terminates the reception of the iamge packets by setting the RECEPTION COMPLETION FLAG in the RAM 44 when the content of said area reaches zero. Subsequently it sets the response bits to the succeeding command packet, including the bit for asking the completion of reception.

As explained in detail in the foregoing, the information transmitting system of the present invention, performing image transmission in the form of image packets bearing image information and of command packets bearing control information for the image transmission through common optical fibers, enables the transmission of image information at a high speed close to the transmission speed of the optical fiber itself, and allows identification of information without complex separating circuits required in the conventional time-sharing method for identifying plural information on the optical fiber.

Also the identification signal for identifying information on the optical fiber can be easily generated and can be processed with a simple circuit. Also the time required for such identification is quite short and is not a trouble in high-speed transmission.

Also the system of the present invention prevents the collision of plural information on the loop since only one terminal can generate the information packet at a time, and the priority for such packet generation in the loop is automatically and dynamically determined by a simple structure.

Furthermore, the detection of loop breakage can be performed by each terminal in a simple manner, without requiring a particular protocol exclusively for this purpose.

Furthermore, the system of the present invention allows high-speed image transmission among plural terminals in case of transmitting the image information to plural terminals, since the information is transmitted in each terminal through a first line directly connected to the recording unit and a second line connected to a succeeding terminal, whereby the transmission to the succeeding terminal is achieved only with a delay required for identification of the information in each terminal.

In addition to the foregoing, the system of the present invention is capable of giving plural instructions to plural terminals by single transmission of control information, thus reducing the time required for the protocol, and of sending a different number of images to plural destinations through single protocol.

Although the foregoing embodiment has been described with reference to the image transmission among four terminals, it will be understood that the number of the terminals is not limited to such case. Also each terminal need not necessarily be provided with the recording function and the reading function, but may be provided with either function or with additional functions such as a display function.

What I claim is:

1. An image transmission system comprising:
   a plurality of image processing means;
   a signal transmission channel to which each of said image processing means is connected and through which an image signal and a control signal associated with transmission of the image signal are transferred between said plurality of image processing means, each of said plurality of image processing means being constructed to transmit an image signal through said signal transmission channel only upon receipt of a control signal indicating acceptance of communication from another of said image processing means; and
   determining means for determining whether said control signal indicating acceptance of communication is transmitted to said signal transmission channel, at the start of operation of said system, provided with each image processing means;
   only one of said plurality of image processing means of said system, which is determined by said determining means to transmit said control signal, transmitting said control signal at the start of operation of said system.

2. A system according to claim 1, wherein said signal transmission channel connects said plurality of image processing means to each other in a loop configuration.

3. A system according to claim 1, wherein at least one of said plurality of image processing means comprises reading means for reading an original image to generate the image signal representing the original image.

4. A system according to claim 1, wherein at least one of said plurality of image processing means comprises printing means for printing an image based on the received image signal.

5. A system according to claim 1, wherein said image processing means, which has been determined by said determining means to transmit said control signal, includes means for determining if said system is in an abnormal condition, if the delivered control signal is not returned from others of said image processing means within a predetermined time after said determined image processing means transmits the control signal.

6. An image transmission system comprising:
   a plurality of image processing means, each of said image processing means being adapted to transmit and receive first and second packet data representing an image signal and a control signal, respectively; and
   a signal transmission channel to which each of said image processing means is connected and through which the first and second packet data are individually transferred between said plurality of image processing means;
   wherein the data length of the first packet data is different from the data length of the second packet data, and the data length of the first packet data is dependent upon the size of the image represented thereby.

7. A system according to claim 6, wherein said signal transmission channel connects said plurality image processing means with each other in a loop configuration.

8. A system according to claim 6, wherein at least one of said plurality of image processing means comprises reading means for reading an original image to generate the image signal representing the original image.

9. A system according to claim 6, wherein at least one of said plurality of image processing means comprises printing means for printing an image based on the received image signal.

10. A system according to claim 6, wherein said signal transmission channel comprises an optical transmission line adapted to transmit an optical signal.

11. An image transmission system comprising:
    a plurality of image processing means; and
    a loop configuration signal transmission channel to which each of said image processing means is connected and through which an image signal and a control signal associated with transmission of the image signal are transferred between said plurality of image processing means;
    one of said plurality of image processing means being constructed to transmit a specified control signal to said signal transmission channel at the start of operation of said system, and to identify whether the delivered control signal has been returned from any other of said image processing means within a predetermined time, so that abnormality of said system is detected.

12. A system according to claim 11, wherein said one of said image processing means includes timer means for measuring said predetermined time starting from transmission of said specified control signal, and identifies an abnormality of said system based on the time measurement of said timer means.

13. A system according to claim 11, wherein at least one of said plurality of image processing means comprises reading means for reading an original image to generate the image signal representing the original image.

14. A system according to claim 11, wherein at least one of said plurality of image processing means comprises printing means for printing an image based on the received image signal.

* * * * *

UNITED STATES PATENT AND TRADEMARK OFFICE
CERTIFICATE OF CORRECTION

PATENT NO. : 4,817,177
DATED : March 28, 1989
INVENTOR(S) : KATSUICHI SHIMIZU

Page 1 of 2

It is certified that error appears in the above-identified patent and that said Letters Patent is hereby corrected as shown below:

ON THE TITLE PAGE,
IN [63] RELATED U.S. APPLICATION DATA

"Continuation of Ser. No. 873,293, Jun. 9, 1986, abandoned." should read --Continuation of Ser. No. 873,293, Jun. 9, 1986, abandoned, which in turn is a continuation of Ser. No. 391,867, Jun. 24, 1982, also abandoned.--.

Before "[51] Int. Cl." insert
--[30] Foreign Application Priority Data
July 1, 1981   Japan ........................ 56-103785
July 1, 1981   Japan ........................ 56-103786
July 1, 1981   Japan ........................ 56-103787
July 1, 1981   Japan ........................ 56-103788
July 1, 1981   Japan ........................ 56-103789
July 1, 1981   Japan ........................ 56-103790
July 1, 1981   Japan ........................ 56-103791

COLUMN 1

Lines 4-5, "Continuation of Ser. No. 873,293, Jun. 9, 1986, abandoned." should read --Continuation of Ser. No. 873,293, Jun. 9, 1986, abandoned, which in turn is a continuation of Ser. No. 391,867, Jun. 24, 1982, also abandoned.--.
Line 23, "the" should be deleted.
Line 65, "line/mn" should read --line/mm--.

UNITED STATES PATENT AND TRADEMARK OFFICE
CERTIFICATE OF CORRECTION

PATENT NO. : 4,817,177
DATED : March 28, 1989
INVENTOR(S) : KATSUICHI SHIMIZU

It is certified that error appears in the above-identified patent and that said Letters Patent is hereby corrected as shown below:

COLUMN 8

Line 13, "terminal B, C," should read --terminals B, C,--.

COLUMN 17

Line 37, "thesstatus" should read --the status--.

COLUMN 20

Line 20, "plurality image" should read --plurality of image--.

Signed and Sealed this

Twenty-sixth Day of December, 1989

Attest:

JEFFREY M. SAMUELS

Attesting Officer      Acting Commissioner of Patents and Trademarks